United States Patent [19]
Pritchard et al.

[11] Patent Number: 5,853,342
[45] Date of Patent: Dec. 29, 1998

[54] OFFSET TRANSFER CASE

[75] Inventors: Larry A. Pritchard, Sterling Heights, Mich.; Parvinder Ahluwalia, Manlius, N.Y.; James S. Brissenden, Baldwinsville, N.Y.; John D. Zalewski, Liverpool, N.Y.

[73] Assignee: New Venture Gear, Inc., Troy, Mich.

[21] Appl. No.: 816,022

[22] Filed: Mar. 11, 1997

Related U.S. Application Data

[60] Provisional application No. 60/014,695 Apr. 2, 1996.

[51] Int. Cl.⁶ .................................................. F16H 37/08
[52] U.S. Cl. ........................... 475/206; 475/198; 180/249
[58] Field of Search .................................. 475/198, 200, 475/206, 207, 220; 180/247, 248, 249, 250

[56] References Cited

U.S. PATENT DOCUMENTS

| | | |
|---|---|---|
| 4,677,875 | 7/1987 | Batchelor . |
| 5,078,660 | 1/1992 | Williams et al. . |
| 5,106,351 | 4/1992 | Williams et al. . |
| 5,159,847 | 11/1992 | Williams et al. . |
| 5,358,454 | 10/1994 | Bowen et al. . |
| 5,363,938 | 11/1994 | Wilson et al. . |
| 5,599,249 | 2/1997 | Zalewski et al. . |
| 5,609,540 | 3/1997 | Brissenden et al. . |
| 5,651,749 | 7/1997 | Wilson et al. ...................... 475/198 X |
| 5,655,986 | 8/1997 | Wilson et al. ...................... 475/206 X |
| 5,662,543 | 9/1997 | Forsyth ..................................... 475/198 |
| 5,695,022 | 12/1997 | Zalewski et al. ....................... 180/249 |
| 5,702,321 | 12/1997 | Bakowshi et al. .................. 180/249 X |
| 5,704,866 | 1/1998 | Pritchard et al. ....................... 475/206 |
| 5,704,867 | 1/1998 | Bowen ................................. 475/205 X |
| 5,720,688 | 2/1998 | Wilson et al. ...................... 475/198 X |

Primary Examiner—Dirk Wright
Assistant Examiner—Peter T. Kwon
Attorney, Agent, or Firm—Harness, Dickey & Pierce, P.L.C.

[57] ABSTRACT

A transfer case for use in a four-wheel drive vehicle. The transfer case has an input shaft supported for rotation about a first rotary axis, a first output shaft supported for rotation about a second rotary axis, a second output shaft supported for rotation about a third rotary axis, and a torque transfer arrangement for delivering drive torque from the input shaft to each of the first and second output shafts.

38 Claims, 14 Drawing Sheets

OFFSET TRANSFER CASE

CROSS-REFERENCE TO RELATED APPLICATION

This application is based upon and claims priority to U.S. Provisional patent application Ser. No. 60/014,695 filed Apr. 2, 1996, and entitled Offset Transfer Case, the specification and drawings of which are herein expressly incorporated by reference.

BACKGROUND OF THE INVENTION

The present invention relates to a power transfer system for a four-wheel drive motor vehicle and, in particular, to a transfer case having its input shaft offset from each of its front and rear output shafts.

In view of the increased popularity of four-wheel drive vehicles, a plethora of power transfer systems are currently utilized for distributing tractive power (i.e., drive torque) to all four wheels of the motor vehicle. Conventionally, most four-wheel drive power transfer systems include a transfer case having an input shaft driven by the transmission output shaft, a rear output shaft driving the rear wheels, a front output shaft driving the front wheels, and a torque transfer arrangement that is operable for continuously or selectively transferring drive torque from the input shaft to one or both of the front and rear output shafts.

Currently, several different types of power transfer systems are being utilized in four-wheel drive vehicles. In "part-time" four-wheel drive systems, the transfer case is equipped with a mode shift mechanism which permits the vehicle operator to selectively couple and de-couple the front and rear output shafts for shifting the vehicle between a two-wheel drive mode and a four-wheel drive mode. An example of a part-time transfer case is shown and disclosed in commonly-owned U.S. Pat. No. 5,159, 847 to Williams et al. Alternatively, "on-demand" power transfer systems are used to automatically transfer drive torque to the non-driven wheels when traction is lost at the driven wheels without any input or action required on the part of the vehicle operator. For instance, a torque transfer device can be installed in the transfer case for transferring drive torque from the rear output shaft to the front output shaft when an excessive speed differential occurs therebetween. Commonly-owned U.S. Pat. No. 5,358,454 to Bowen et al. discloses a geared traction unit suitable for such an application while an electronically-controlled on-demand system is disclosed in commonly-owned U.S. Pat. No. 5,363,938 to Wilson et al. Finally, in "full-time" four-wheel drive systems, the transfer case is equipped with an interaxle differential for continuously distributing the drive torque between the front and rear output shafts while permitting speed differentiation therebetween. Commonly-owned U.S. Pat. No. 4,677,873 to Eastman et al. discloses an exemplary full-time transfer case. Many full-time transfer cases are also equipped with a "slip limiting" device for selectively or automatically limiting or preventing such speed differentiation across the interaxle differential in response to the occurrence of excessive wheel slip. Commonly-owned U.S. Pat. Nos. 5,078,660 and 5,106, 351 to Williams et al. disclose exemplary full-time transfer cases equipped with a viscous coupling for limiting slip across the interaxle differential.

The above-noted types of transfer cases are commonly designed to have one or both output shafts offset from the input shaft. In most transfer cases, the rotational axis of the front output shaft is offset from the common rotational axis shared by the input shaft and the rear output shaft. In contrast, some transfer cases have the front and rear output shafts commonly aligned for rotation about a rotary axis that is offset from the rotary axis of the input shaft. While such transfer cases encompass the majority of conventional four-wheel drive arrangements, the need exists to provide alternatives for use in those vehicular application in which such conventional transfer cases are not applicable.

SUMMARY OF THE INVENTION

Accordingly, the present invention is directed to a transfer case having an input shaft adapted to be driven by the transmission output shaft about a first rotary axis, a first output shaft supported for rotation about a second rotary axis, a second output shaft supported for rotation about a third rotary axis, and a torque transfer arrangement for delivering drive torque from the input shaft to each of the first and second output shafts.

In one embodiment, the transfer case of the present invention is equipped with a gear reduction apparatus, an interaxle differential, and a range shift mechanism that are cooperatively operable for establishing full-time four-wheel high-range and low-range drive modes and a neutral non-driven mode.

According to another embodiment, the transfer case of the present invention is equipped with a torque transfer apparatus for automatically controlling the torque distribution across the interaxle differential in response to speed differentials between the front and rear output shafts.

According to another alternative embodiment, the transfer case of the present invention is equipped with the torque transfer apparatus which is operably located between the first and second output shafts for establishing an on-demand four-wheel drive mode.

As a further object of the present invention, the torque transfer apparatus used in either of the full-time transfer case or the on-demand transfer case can be a speed-sensitive device or an electronically-controlled transfer clutch.

Another object of the present invention is to equip the transfer case with a synchronized range shift mechanism for permitting "on-the-fly" shifting between the four-wheel high-range and low-range modes.

BRIEF DESCRIPTION OF THE DRAWINGS

Further objects, features and advantages of the present invention will become apparent from analysis of the following written specification, the accompanying drawings, and the appended claims in which:

DETAILED DESCRIPTION OF THE PREFERRED EMBODIMENTS

In general, the present invention is directed to various embodiments of a transfer case for use in four-wheel drive vehicles in which the rotational axis of the transfer case input shaft is offset relative to the rotational axis of each of its front and rear output shafts.

Figure 1:
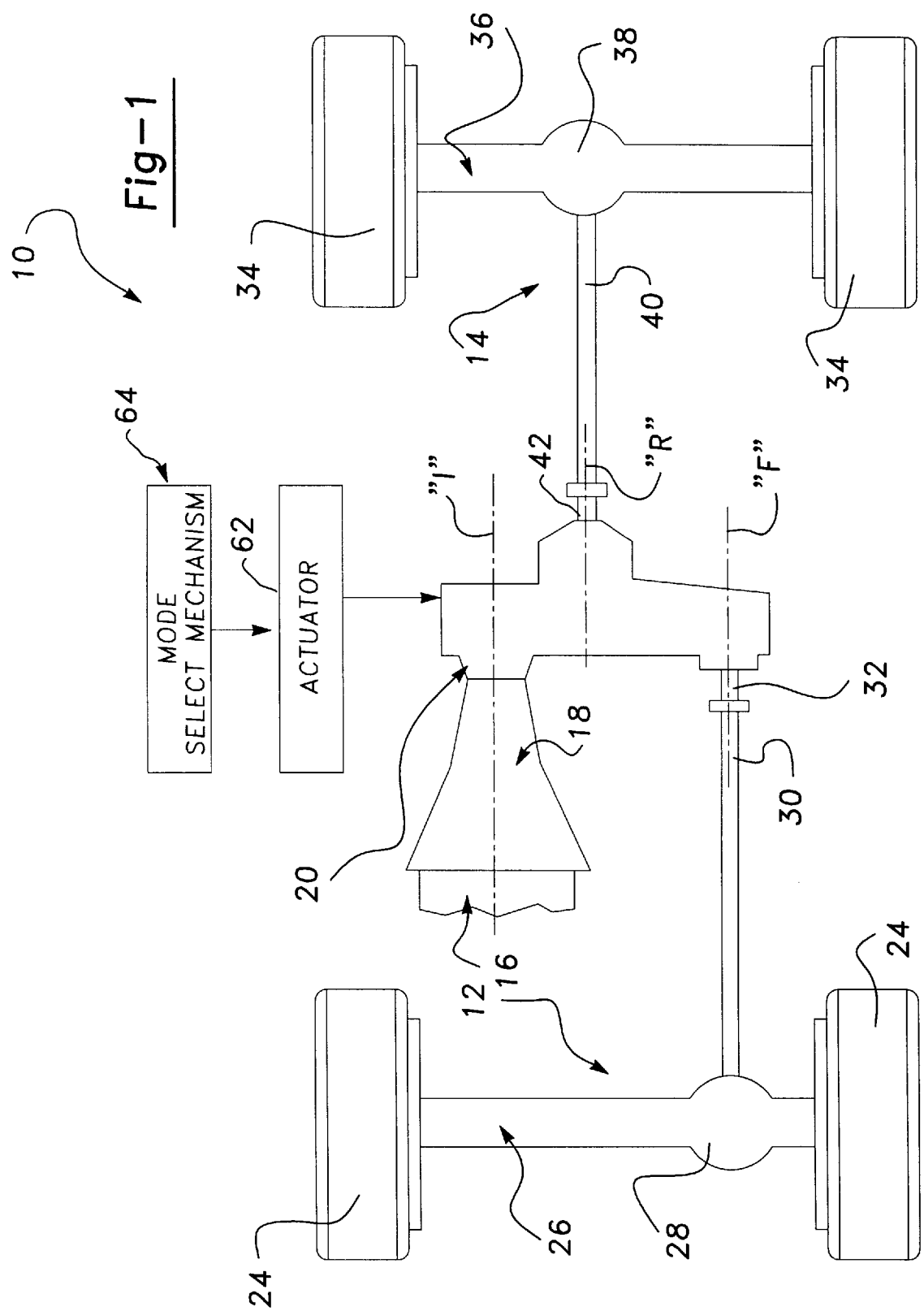
FIG. 1 is a plan view of a power transfer system for a four-wheel drive motor vehicle utilizing the transfer cases of the present invention for connecting the drivetrain to the front and rear drivelines.

Referring to FIG. 1 of the drawings, a power transfer system 10 for a four-wheel drive vehicle is shown which includes various embodiments of a transfer case, each incorporating one or more of the novel principals and features of the present invention. The motor vehicle drivetrain includes a front driveline 12 and a rear driveline 14 both of which are drivable from a source of power, such as an engine 16 through a transmission 18 which may be of either the manual or automatic type. In the particular embodiment shown, the drivetrain includes a transfer case 20 for selectively transmitting drive torque from engine 16 and transmission 18 to front driveline 12 and rear driveline 14. As will be detailed hereinafter with greater specificity, the input to transfer case 20 is commonly aligned with the output of transmission 18 for rotation about a first rotary axis, denoted by reference letter "I". Front driveline 12 includes a pair of front wheels 24 connected at opposite ends of a front axle assembly 26 having a front differential 28 that is coupled to one end of a front prop shaft 30, the opposite end of which is coupled to a front output shaft 32 of transfer case 20. As seen, front output shaft is supported in transfer case 20 to rotate about a second rotary axis, denoted by reference letter "F". Similarly, rear driveline 14 includes a pair of rear wheels 34 connected at opposite ends of a rear axle assembly 36 having a differential 38 coupled to one end of a rear prop shaft 40, the opposite end of which is interconnected to a rear output shaft 42 of transfer case. Rear output shaft 42 is shown to be supported within transfer case 20 for rotation about a third rotary axis, denoted by reference letter "R".

Figure 2:
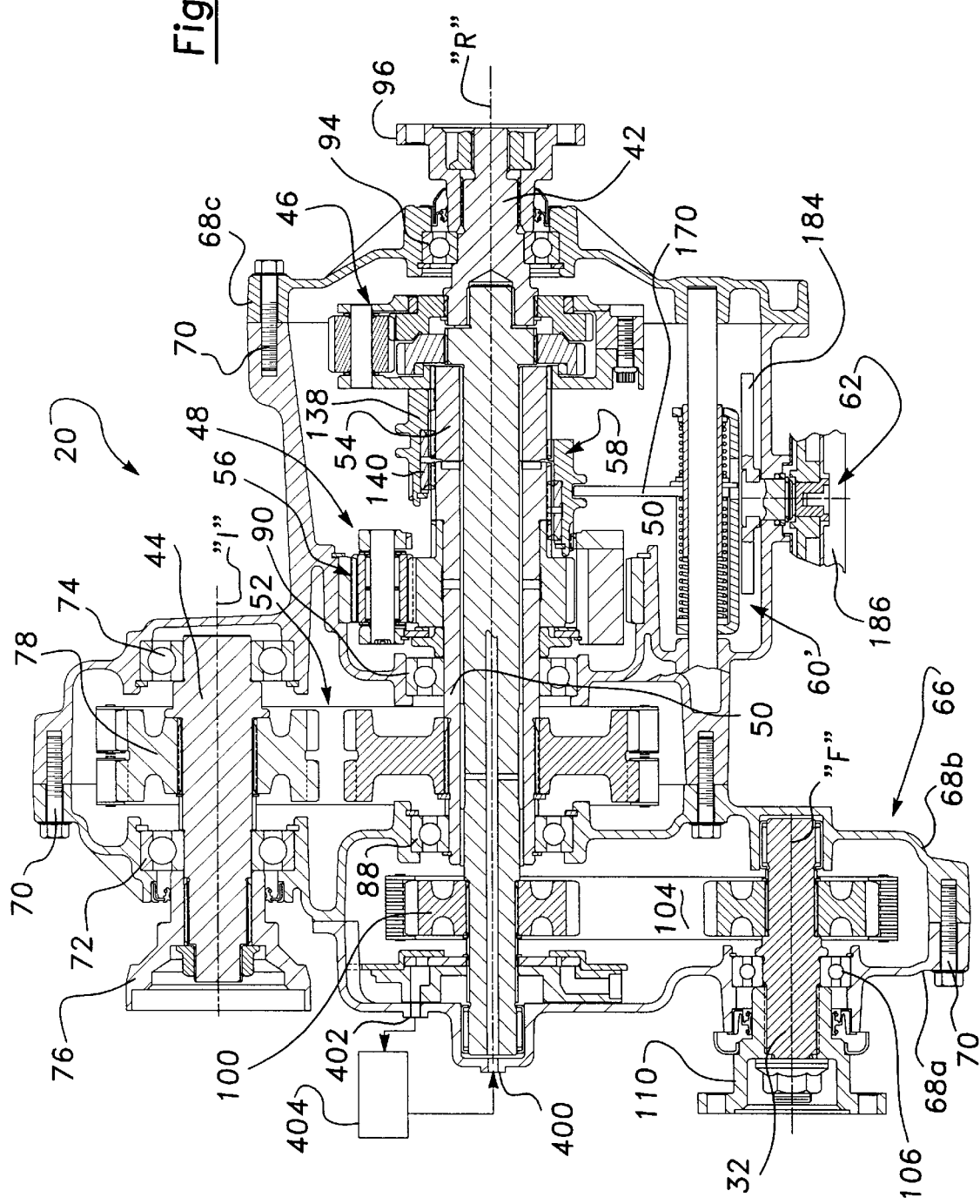
FIG. 2 is a full sectional view of a full-time transfer case according to one embodiment of the present invention.
Figure 3:
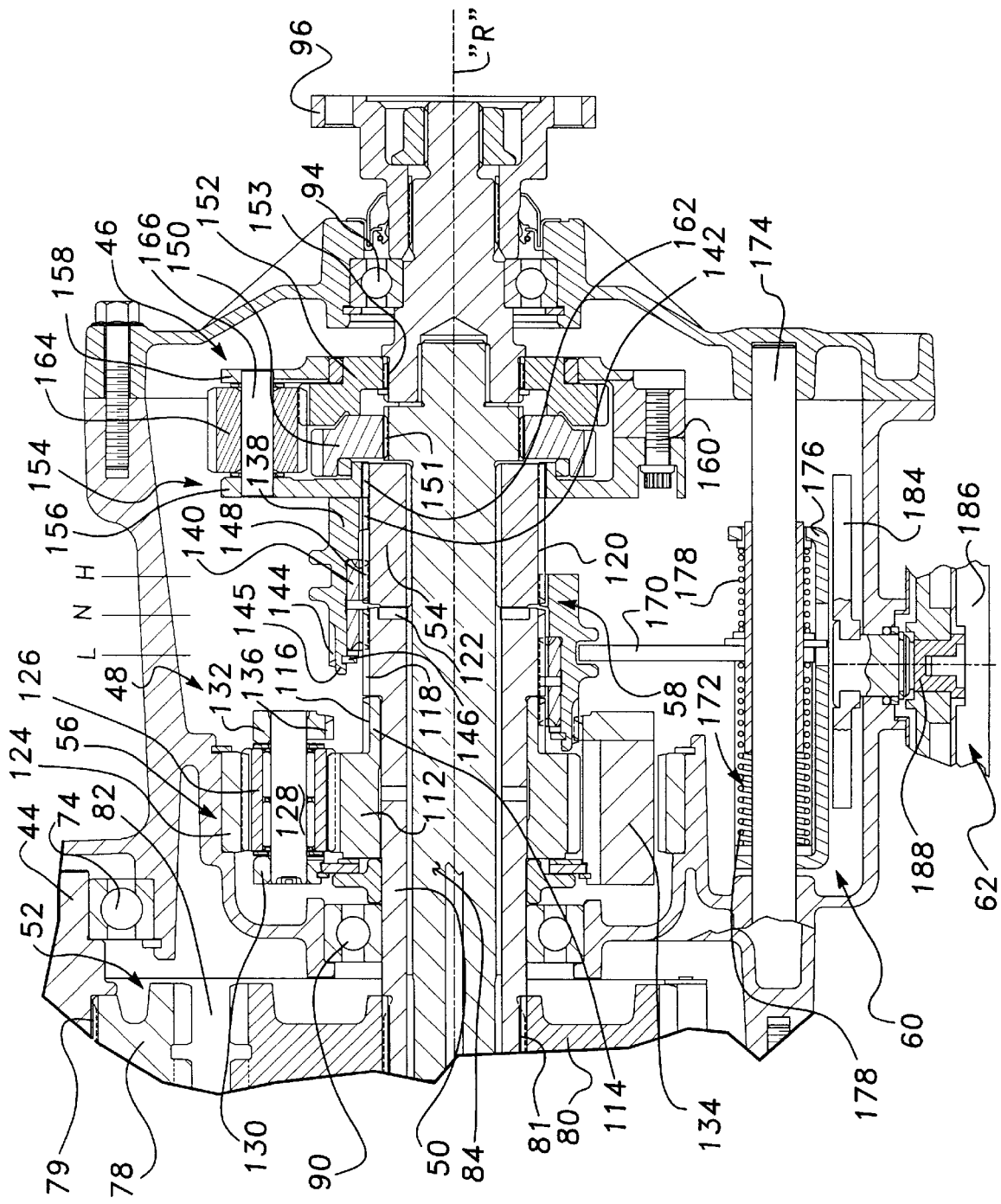
FIGS. 3 and 4 are enlarged fragmentary views of the transfer case shown in FIG. 2.
Figure 4:
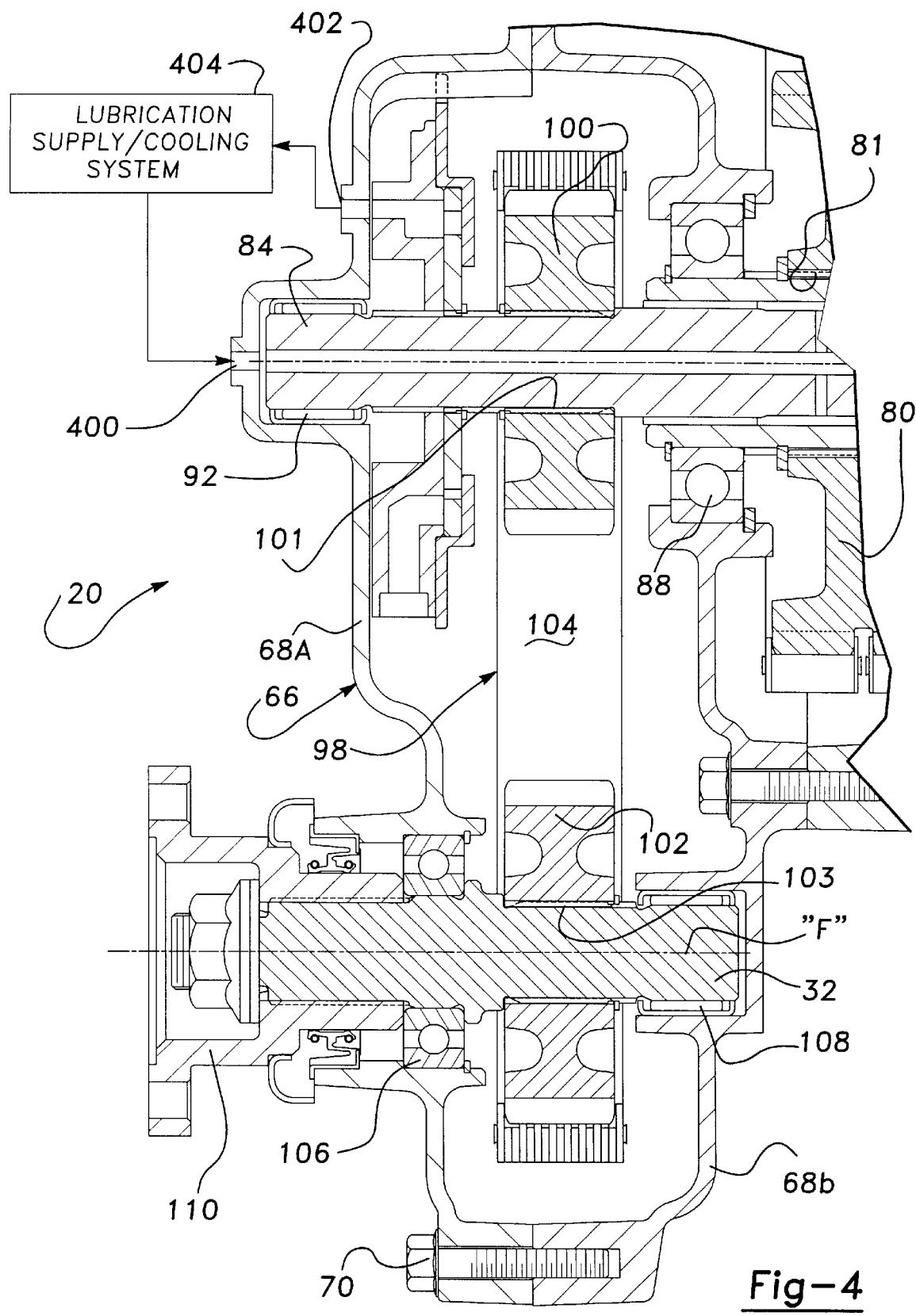

Referring now to FIGS. 2 through 4, transfer case 20 is shown to be equipped with an input shaft 44 that is adapted to be rotatably driven by the output of transmission 18, an interaxle differential 46 having output members interconnecting front output shaft 32 and rear output shaft 42 so as to distribute drive torque and permit speed differentiation therebetween, and a torque transfer arrangement 48 that is operable for selectively transferring drive torque from input shaft 44 to the input member of interaxle differential 46.

Torque transfer arrangement 48 includes a drive shaft 50, a drive mechanism 52 for transferring drive torque from input shaft 44 to drive shaft 50, a quill shaft 54 interconnected to the input member of interaxle differential 46, a gear reduction apparatus 56 operably associated with drive shaft 50, and a range clutch 58 operable for selectively coupling quill shaft 54 for driven rotation with either of drive shaft 50 or the output of gear reduction apparatus 56. Transfer case 20 further includes a shift mechanism 60 for moving range clutch 58, an actuator 62 for actuating shift mechanism 60 in response to an input by the vehicle operator for establishing one of three available modes. These modes include a full-time four-wheel high-range drive mode, a full-time four-wheel low-range drive mode, and a neutral non-driven mode. A mode select mechanism 64 is schematically shown which is manipulated under the control of the vehicle operator for signalling actuator 62 of the particular mode selected.

With continued reference to FIGS. 2 through 4, transfer case 20 is shown to include a housing 66 defined by a series of housing sections 68a, 68b and 68c that are interconnected via fasteners 70. Input shaft 44 is shown supported for rotation in housing 66 via bearing assemblies 72 and 74 for rotation about rotary axis "I". A yoke 76 is secured to input shaft 44 and is adapted for connection to the output shaft of transmission 18. Drive mechanism 52 includes a drive sprocket 78 secured via a splined connection 79 to input shaft 44 for common rotation therewith. Drive mechanism 52 also includes a driven sprocket 80 that is fixed via a splined connection 81 for common rotation with drive shaft 50. A drive chain 82 interconnects driven sprocket 76 to drive sprocket 72. Drive shaft 50 is an elongated tubular shaft that concentrically surrounds and is rotatably supported on a transfer shaft 84. Drive shaft 50 is supported in housing 66 via bearing assemblies 88 and 90. Moreover, one end of transfer shaft 84 is rotatably supported in housing 66 via a bearing assembly 92 while its opposite end is piloted in a bore formed in one end of rear output shaft 42. In turn, rear output shaft 42 is supported in housing 66 via a bearing assembly 94. A rear yoke 96 is shown secured to the opposite end of rear output shaft 42 for connection to rear driveline 14 in an otherwise conventional manner. Thus, drive shaft 50, transfer shaft 84 and rear output shaft 42 are commonly aligned for rotation about rotary axis "R".

As best seen from FIG. 4, transfer case 20 includes a front transfer mechanism 98 that is provided for transferring drive torque from transfer shaft 84 to front output shaft 32. More particularly, front transfer mechanism 98 includes a second drive sprocket 100 secured via splined connection 101 for rotation with transfer shaft 84, a second driven sprocket 102 secured via splined connection 103 for rotation with front output shaft 32, and a second drive chain 104 interconnecting second driven sprocket 102 to second drive sprocket 100. Front output shaft 32 is shown supported from housing 66 by a pair of axially spaced bearing assemblies 106 and 108 for rotation about the "F" rotary axis. A front yoke 110 is shown secured to front output shaft 32 for connection to the remainder of front driveline 12.

Referring specifically to FIGS. 2 and 3, gear reduction apparatus 56 is shown to includes a sun gear 112 that is rotatably supported on drive shaft 50. Sun gear 112 includes an axial extension 114 on which external clutch teeth 116 are formed. In addition, external clutch teeth 118 are formed on an annular end portion of drive shaft 50 that are located adjacent to, and are alignable with, sun gear clutch teeth 116. Quill shaft 54 is rotatably supported on transfer shaft 84 and has external clutch teeth 120 formed thereon that are located adjacent to, and are alignable with, drive shaft clutch teeth 118. A radial bearing assembly 122 is disposed between drive shaft 50 and quill shaft 54 to facilitate relative rotation therebetween. Gear reduction apparatus 56 also includes a ring gear 124 that is fixed to housing 66 so as to be held stationary relative thereto. A plurality of pinion gears 126 (only one shown) are each rotatably supported on a pinion shaft 128, with each pinion shaft 128 extending between front and rear carrier rings 130 and 132, respectively, which, combined with pinion shafts 128 and pinion gears 126 define a planet carrier 134. Pinion gears 126 are meshed with sun gear 112 and ring gear 124. Finally, internal clutch teeth 136 are formed on rear carrier ring 132.

Range clutch 58 include a pair of sleeves 138 and 140 that are selectively engageable with one or more of sun gear 112, drive shaft 50 and quill shaft 54 for establishing two different drive connections between drive shaft 50 and quill shaft 54. In particular, outer sleeve 138 has internal clutch teeth 142 in constant meshed engagement with clutch teeth 120 on quill shaft 54. Likewise, outer sleeve 138 has external clutch teeth 144 formed on a drum-like axial extension 145 thereof that are selectively engageable with internal clutch teeth 136 on rear carrier ring 132. Inner sleeve 140 is rotatably supported against an inner bearing surface formed in axial extension 145 portion of outer sleeve 138 and is retained relative thereto by a snap ring 146. Inner sleeve 140 includes internal clutch teeth 148 that continuously mesh with external teeth 118 of drive shaft 50 and which are also selectively engageable with either sun gear clutch teeth 116 or quill shaft clutch teeth 120 depending on the axial position of range clutch 58. Due to the meshed connection between outer sleeve 138 and quill shaft 54 and the meshed connection between inner sleeve 140 and drive shaft 50, range clutch 58 can be axially slid between a low-range position ("L"), a neutral position ("N"), and a high-range position ("H"). When range clutch 58 is positioned in the "L" position, as shown in the lower half of FIGS. 2 and 3, clutch teeth 148 of inner sleeve 140 engage both sun gear clutch teeth 116 and drive shaft clutch teeth 118. In addition, external clutch teeth 144 on outer sleeve 138 engage carrier ring clutch teeth 136 while its internal clutch teeth 142 engage quill shaft clutch teeth 120. As such, inner sleeve 140 couples sun gear 112 for common rotation with drive shaft 50. Thus, sun gear 112 drives pinion gears 126 around ring gear 124 such that planet carrier 134 is driven at a reduced speed ratio relative to drive shaft 50. Moreover, due to the connection of planet carrier 134 to quill shaft 54 via outer sleeve 138 of range clutch 58, quill shaft 54 is also driven at the reduced speed ratio relative to drive shaft 50 for establishing the low-range drive connection therebetween.

When range clutch 58 is moved from its L position into its N position, clutch teeth 148 of inner sleeve 140 are de-coupled from sun gear teeth 116 and thus only engage drive shaft teeth 118. Moreover, clutch teeth 144 on outer sleeve 138 are uncoupled from carrier ring teeth 136 while its internal clutch teeth 142 only engage quill shaft clutch teeth 120. In this position, inner sleeve 140 is free to rotate relative to outer sleeve 138. As such, there is no drive connection between drive shaft 50 and quill shaft 54, whereby the neutral non-driven mode is established. Finally, when range clutch 58 is moved from its N position to its H position, as seen in the upper half of FIGS. 2 and 3, a direct connection is established between drive shaft 50 and quill shaft 54. In particular, with range clutch 58 in the H position, outer sleeve 138 is uncoupled from planet carrier 134 and its internal clutch teeth 142 are maintained in engagement with quill shaft teeth 120. Moreover, internal clutch teeth 148 of inner sleeve 140 mesh with both drive shaft teeth 118 and quill shaft teeth 120 such that inner sleeve 140 directly couples quill shaft 54 for rotation with drive shaft 50 at a direct speed ratio, thereby establishing the high-range drive connection therebetween.

To provide means for establishing a full-time (i.e., differentiated) four-wheel drive mode whereby drive torque is delivered to both front driveline 12 and rear driveline 14, transfer case 20 is equipped with interaxle differential 46 having an input driven by quill shaft 54 and outputs adapted to drive or be driven by front and rear output shafts 32 and 42, respectively. Interaxle differential 46 is a dual-planetary assembly which includes a first sun gear 150 secured by a splined connection 151 to the aft end of transfer shaft 84, a second sun gear 152 fixed via a splined connection 153 to rear output shaft 42, and a planet carrier 154 interconnecting quill shaft 54 to sun gears 150 and 152. In particular, planet carrier 154 includes a first carrier ring 156 and a second carrier ring 158 interconnected by fasteners 160. First carrier ring 156 is shown to be coupled via a splined connection 162 to quill shaft 54. A set of first or half-length planet gears (not shown) are rotatably supported on pinion shafts (not shown) between carrier ring 156 and 158 and mesh with first sun gear 150. A set of second or full-length planet gears 164 are rotatably supported on pinion shafts 166 between carrier rings 156 and 158 and each mesh with second sun gear 152. Moreover, each first planet gear is meshed with a second planet gear 164 such that they are arranged as meshed pairs around the circumference of planet carrier 154. Thus, when range clutch 58 is located in its H position, the full-time four-wheel high-range drive mode is established. Likewise, when range clutch 58 is located in its L position, the full-time four-wheel low-range drive mode is established. Finally, when range clutch 58 is in its N position, quill shaft 54 is uncoupled from drive shaft 50, whereby no drive torque is delivered to front and rear output shafts 32 and 42, respectively, through interaxle differential 46. As will be understood, the specific gear geometry associated with the intermeshed gears of interaxle differential 46 will determine the torque distribution ratio between front output shaft 32 and rear output shaft 42. While a dual-planetary type construction is shown for interaxle differential 46 it should be understood that any known differential mechanism suitable for use as an interaxle differential could be used in substitution therefor.

To provide means for moving range clutch 58 between its three distinct positions, shift mechanism 60 includes a shift fork 170 that is coupled to outer sleeve 138 of range clutch 58 and a spring-biased apparatus 172 for axially moving shift fork 170. Spring-biased apparatus 172 is mounted on a shift rail 174 secured to housing 66 and includes a bracket 176 mounted on rail 174 and a pair of springs 178. Springs 178 act between bracket 176 and shift fork 170 for applying directional biasing loads on shift fork 170. This arrangement is adapted to bias shift fork 170 for ensuring movement of range clutch 58 to either of its fully meshed L or H positions. A range pin (not shown) secured to shift fork 170 extends into a range slot (not shown) formed in a sector plate 184. The contour of the range slot is designed to produce axial movement of shift fork 170 in response to rotation of sector plate 184. In the particular embodiment shown, actuator 62 is an electric gearmotor 186 having a rotary output shaft 188 that is coupled to sector plate 184. Thus, gearmotor 186 is operable to controllably rotate sector plate 184, in either direction, between its three positions corresponding to the three positions of range clutch 58 in response to control signals sent to gearmotor 186 from a remote controller unit (not shown). The controller unit generates the control signals in response to the mode signals delivered thereto upon the vehicle operator actuating mode select mechanism 64 which, in this case, includes appropriate switches or push-buttons that are mounted in the vehicle's passenger compartment. In a manually-operated alternative version, actuator 62 would include a mechanical linkage assembly operable for rotating sector plate 184 and mode select mechanism would include a manually-operable shift lever.

Figure 5:
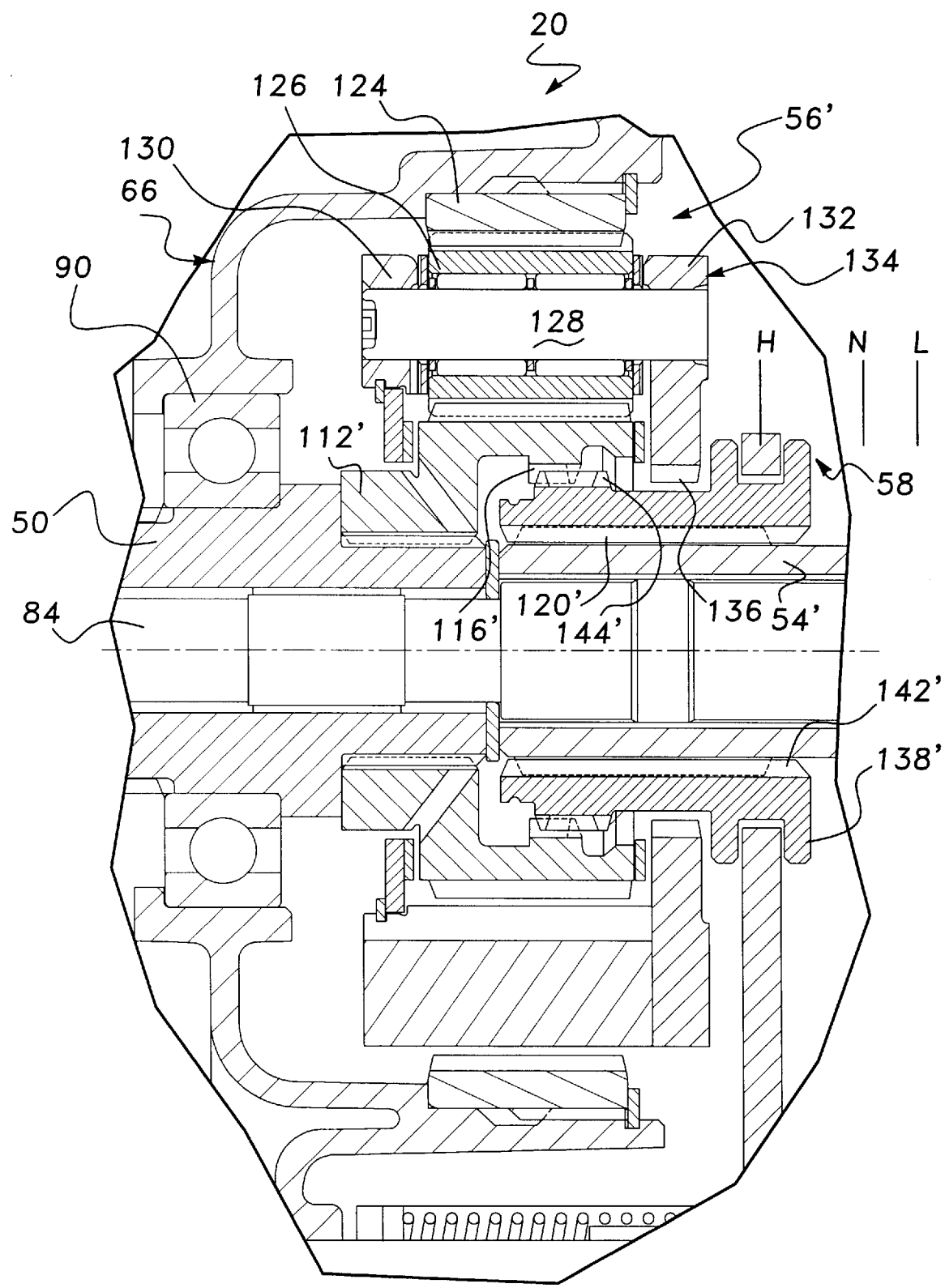
FIG. 5 is a partial sectional view showing an alternative gear reduction unit incorporated into the transfer case of FIG. 2.

With reference to FIG. 5, a modified gear reduction apparatus 56' is shown which can be substituted for gear reduction apparatus 56 in transfer case 20. Gear reduction apparatus 56' includes a sun gear 112' that is fixed for rotation with drive shaft 50 and which has clutch teeth 116' formed thereon. Quill shaft 54' is rotatably supported on transfer shaft 84 and is fixed via a splined connection to first carrier ring 156 of interaxle differential 46. Ring gear 124 is fixed to housing. Pinion gears 126 on rotatably carried on pinion shafts 128 secured to carrier rings 130 and 132 to define planet carrier 134. Pinion gears 126 are meshed with sun gear 112' and ring gear 124.

Range clutch 58 includes a shift sleeve 138' and has internal splines 142' in meshed engagement with external splines 120' formed on quill shaft 54'. Thus, sleeve 138' can slide axially relative to quill shaft 54' between a high-range position ("H"), a neutral position ("N") and a low-range position ("L"). Sleeve 138' has clutch teeth 144' that are engageable with sun gear teeth 116' to establish the high-range direct drive connection between drive shaft 50 and quill shaft 54' when shift sleeve 138' is in the H position. Clutch teeth 144' are engageable with clutch teeth 136 on carrier ring 132 to establish the low-range reduced ratio connection between drive shaft 50 and quill shaft 54' when shift sleeve 138' is in the L position. With shift sleeve 138' in the N position, quill shaft 54' is not driven by drive shaft 50. Shift mechanism 60 is used for moving shift sleeve 138' between its three distinct range positions. Again, the contour of the range slot in sector plate 184 will product the desired axial movement of range sleeve 138'. As with gear reduction apparatus 56, gear reduction apparatus 56' provides two speeds which can be selected by the vehicle operator. Alternatively, transfer case 20 could be a single speed configuration wherein gear reduction apparatuses 56 and 56' would be eliminated and range clutch 58 would be used to establish a drive mode connection between drive shaft 50 and quill shaft 54, 54' and a neutral non-driven mode.

Figure 6:
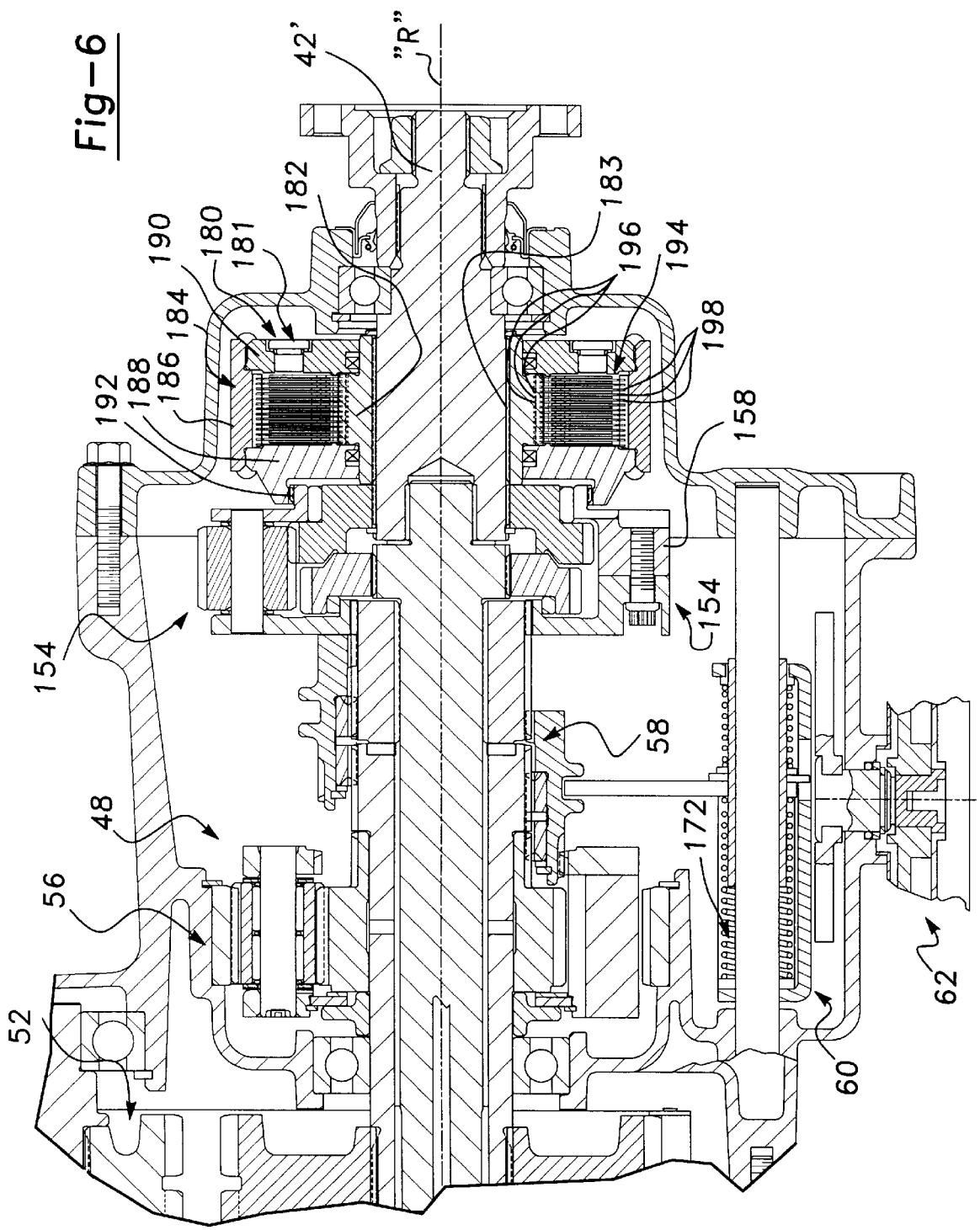
FIG. 6 is a partial sectional view of the full-time transfer case shown in FIG. 2 modified to incorporate a torque transfer apparatus.

Referring to FIG. 6. transfer case 20 is shown in a modified version in which a torque transfer apparatus 180 has been operably installed for automatically controlling the torque distribution across interaxle differential 46 in response to speed differentials (i.e., interaxle slip) between front output shaft 32 and rear output shaft 42. In particular, the majority of the components shown in FIG. 6 are identical to those previously described with reference to FIG. 2 through 4, with those that have been modified now identified with a primed reference numeral. According to the embodiment shown, torque transfer apparatus 180 is a viscous coupling 181 having an inner drum 182 fixed via a splined connection 183 to rear output shaft 42' and a cover assembly 184 supported and sealed relative to inner drum 182 for rotation relative thereto. In particular, cover assembly 184 includes an outer drum 186 to which a front end plate 188 and a rear end plate 190 are secured. Front end plate 188 is shown to be fixed via a splined connection 192 for rotation with second carrier ring 158 of planet carrier 154. A clutch pack 194 is retained within the sealed chamber formed between cover assembly 184 and inner drum 182 and includes a set of inner clutch plates 196 secured for rotation with inner drum 182 and a set of outer clutch plates 198 secured for rotation with outer drum 186. Inner and outer clutch plates 196 and 198 are alternately interleaved and the sealed chamber is filled with a predetermined volume of a viscous fluid. As is known, increasing relative rotation between outer drum 186 and inner drum 182 results in shearing of the viscous fluid within the sealed chamber for transferring torque through clutch pack 194 to the slower rotating components, thereby automatically biasing the torque transferred across interaxle differential 46. Thus, the torque biasing is automatic and speed dependent. Furthermore, it is contemplated that other on-demand torque transfer apparatuses can be substituted for viscous coupling 181. For example, commonly-owned U.S. Pat. No. 5,456, 642 to Frost discloses a geared traction unit which could easily be adapted for use in transfer case 20 as a slip limiting device. As such, it is to be understood that torque transfer apparatus 180 can be any suitable speed-sensitive and/or torque-sensitive device applicable for use in four-wheel drive vehicles.

Figure 7:
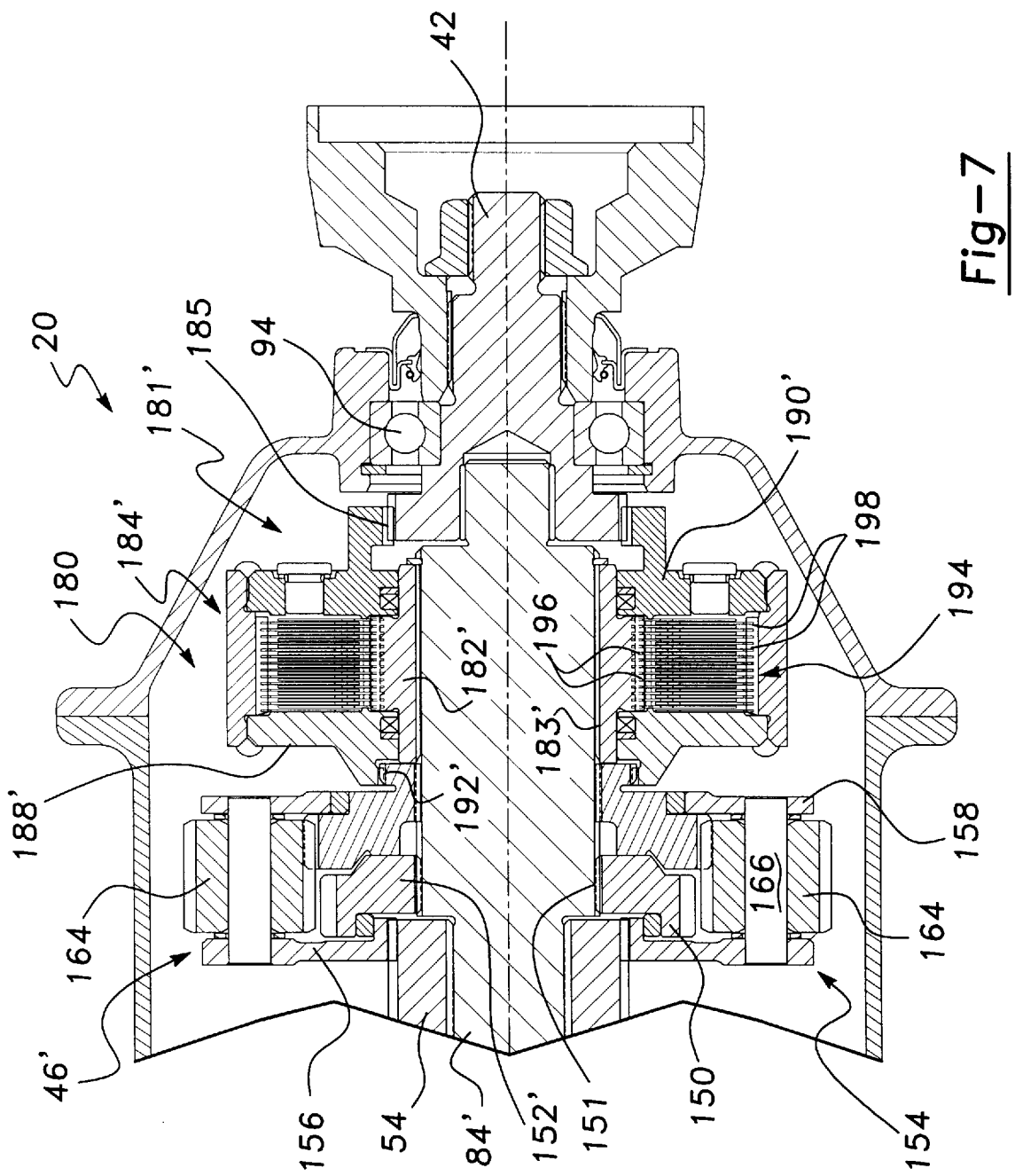
FIG. 7 is a partial sectional view showing an alternative arrangement for the torque transfer apparatus shown in FIG. 6.

Referring to FIG. 7, an alternative to the arrangement shown in FIG. 6 is provided. Specifically, torque transfer apparatus 180 is now shown as a viscous coupling 181' having inner drum 182' fixed via a splined connection 183' to transfer shaft 84' while front end plate 188' of cover assembly 184' is fixed via a splined connection 192' for rotation with second sun gear 152' which is shown journally supported on transfer shaft 84'. Moreover, cover assembly 184' has a rear end plate 190' which is coupled via a splined connection 185 to rear output shaft 42. As such, cover assembly 184' couples second sun gear 152' to rear output shaft 42. The remainder of the components are generally similar to those shown and described for viscous coupling 181 in FIG. 6 with it being understood that viscous coupling 181' also functions as a slip limiting/torque biasing device for limiting excessive slip across differential 46'.

Figure 8:
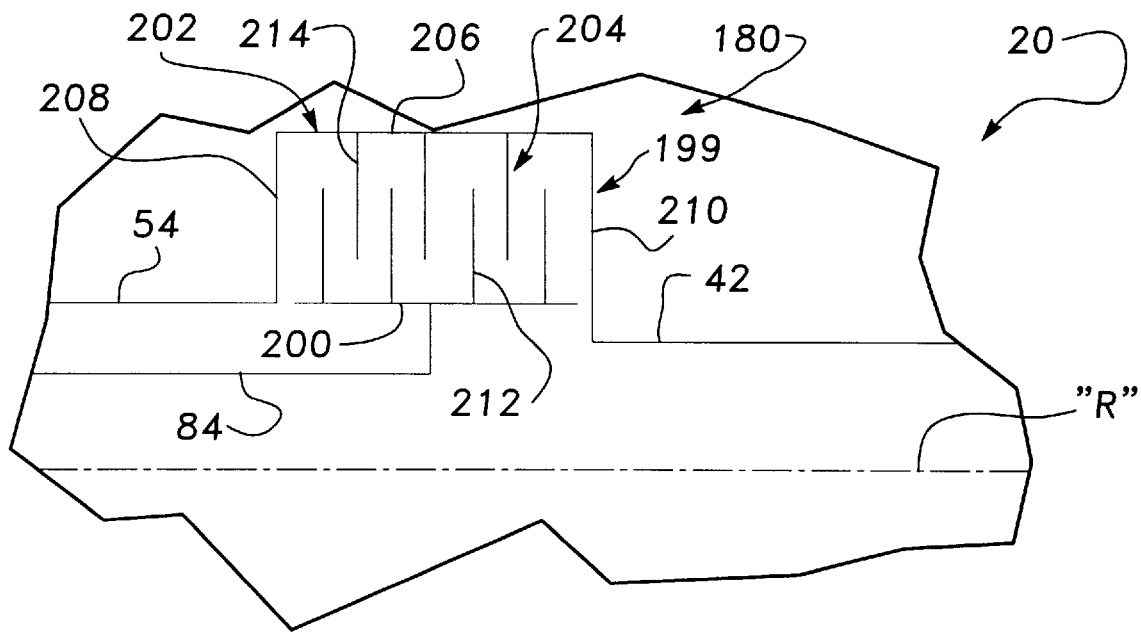
FIG. 8 is a partial schematic illustration of an on-demand four-wheel drive arrangement for the transfer case of the present invention.

Referring now to FIG. 8, a partial schematic view of an alternative construction for transfer case 20 is shown. In general, the modified construction removes interaxle differential 46 and arranges torque transfer apparatus 180 between transfer shaft 84 and rear output shaft 42 for providing an "on-demand" four-wheel drive power transfer system. More particularly, torque transfer apparatus 180 is again disclosed as a viscous coupling 199 having an inner drum 200 fixed for rotation with transfer shaft 84, a cover assembly 202 enclosing and sealed relative to inner drum 200, and a clutch pack 204. Cover assembly 202 includes an outer drum 206, a front end plate 208 that is secured to outer drum 206 and coupled to quill shaft 54, and a rear end plate 210 also secured to outer drum 206 and which is coupled to rear output shaft 42. Thus, cover assembly 202 is arranged to directly transfer drive torque from quill shaft 54 to rear output shaft 42. Clutch pack 204 includes a set of inner clutch plates 212 fixed to inner drum 200 and a set of outer clutch plates 214 fixed to outer drum 206 and which are alternately interleaved within inner clutch plates 212. As noted, drive torque is normally delivered only to rear output shaft 42. However, when traction loss at rear wheels 34 causes rear output shaft 42 to overrun front output shaft 32, viscous coupling 199 is operative to automatically transfer drive torque on-demand to transfer shaft 84 and thus to front output shaft 32. As will be appreciated, the torque transmission characteristics of viscous coupling 199 can be "tuned" for each particular vehicular application to determine at what value of speed difference that torque transmission will occur. Moreover, the torque versus speed difference characteristic can likewise be specifically tuned. While not shown, it is obvious that a modified version of viscous coupling 199 could be arranged to normally transfer drive torque to transfer shaft 84 with torque delivered on-demand to rear output shaft 42.

Figure 9:
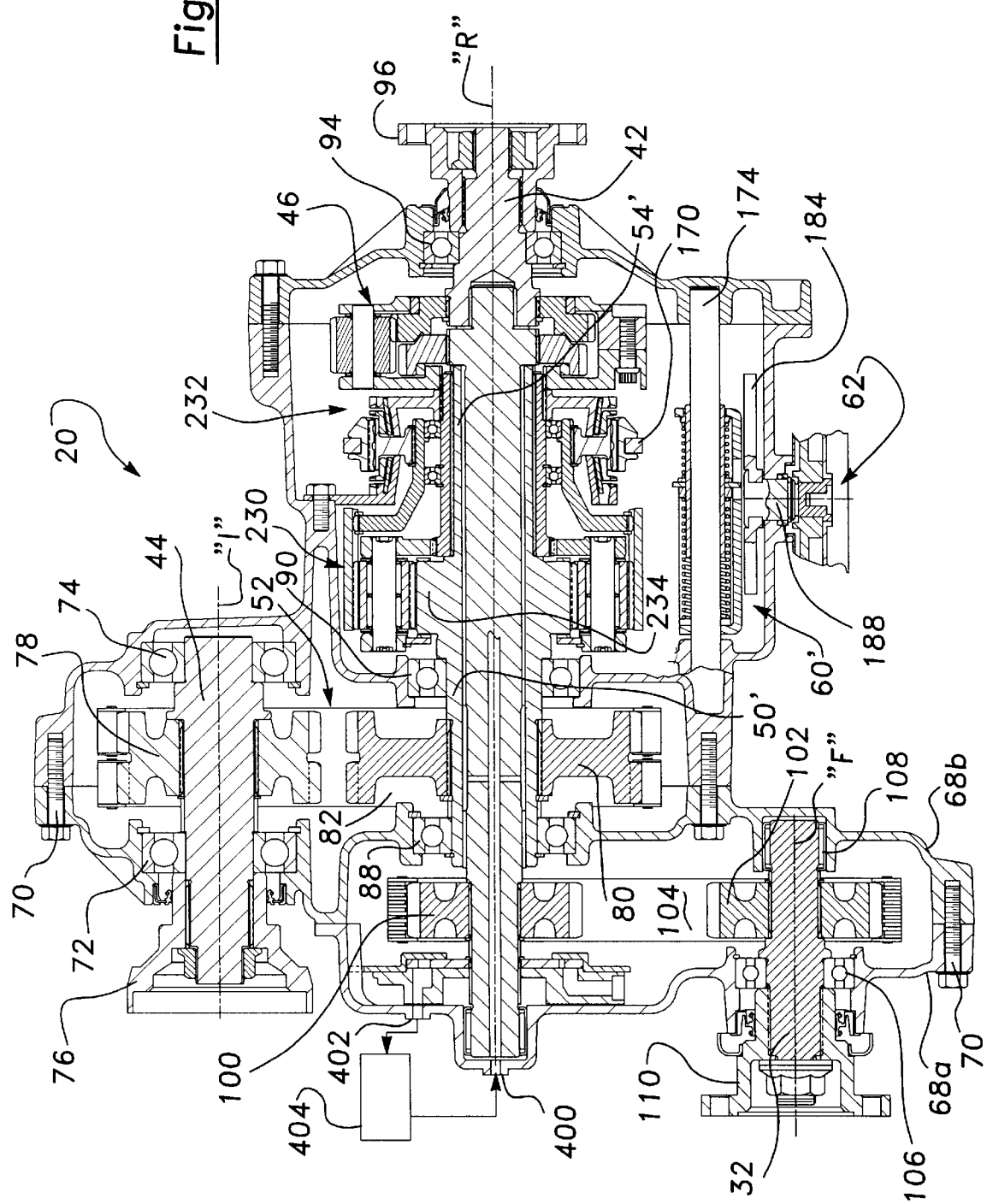
FIG. 9 is a full sectional view of a full-time transfer case equipped with a synchronized range shift mechanism.
Figure 10:
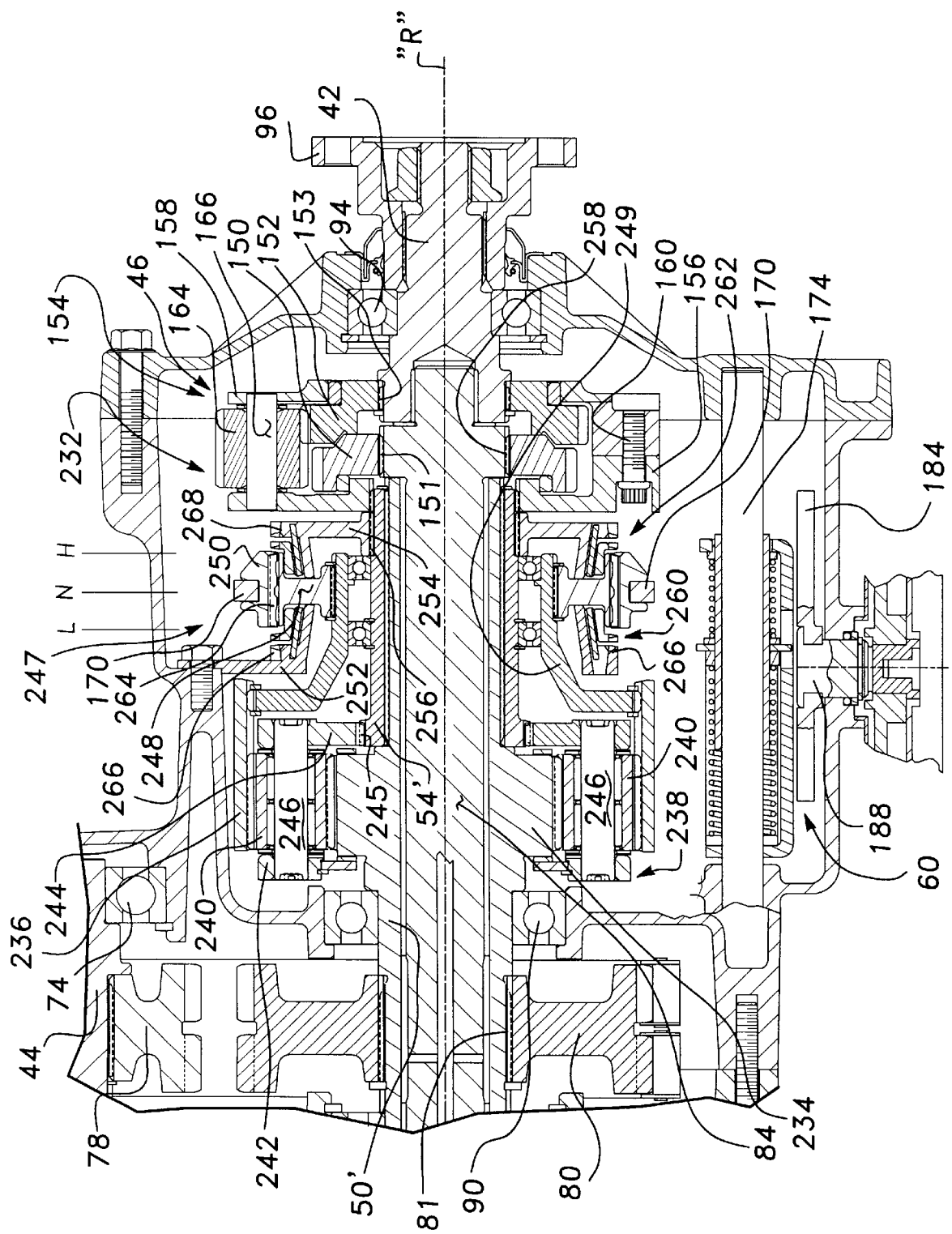
FIG. 10 is an enlarged fragmentary view of FIG. 9.

Referring to FIGS. 9 and 10, transfer case 20 is shown alternatively equipped with a gear reduction unit 230 and a synchronized range shift arrangement 232 that permit "on-the-fly" shifting between the four-wheel high-range and low-range drive modes. As shown, gear reduction unit 230 is a planetary gear assembly having a sun gear 234 internally formed on drive shaft 50', a ring gear 236, and a planet carrier 238 having a plurality of planet gears 240 rotatably supported therefrom that mesh with sun gear 234 and ring gear 236. Planet carrier 238 includes a front carrier ring 242, a rear carrier ring 244, and pinion shafts 246 extending therebetween and on which planet gears 240 are rotatably supported. Rear carrier ring 244 is coupled via splined connection 245 for rotation with quill shaft 54'. Quill shaft 54' is shown rotatably supported on an axial extension of drive shaft 50'. Shift mechanism 232 includes a bidirectional clutch apparatus 247 having a clutch hub 248 fixed for rotation with ring gear 236, and a range sleeve 250 supported for rotation with and axial sliding movement on clutch hub 248. As seen, a bell-shaped reaction member 249 is provided for coupling clutch hub 248 to ring gear 236. Range sleeve 250 is movable between the centered neutral position (N) shown to either a low-range position (L) or a high-range position (H). In particular, when range sleeve 250 is moved to its low-range position, range sleeve 250 couples clutch hub 248 to a stationary brake plate 252 fixed to housing 66. As such, ring gear 236 is held stationary such that planet carrier 238 rotates at a reduced speed ratio relative to drive shaft 50' for establishing the low-range drive connection between drive shaft 50' and quill shaft 54'. Range sleeve 250 can further be moved to its high-range position whereat it couples clutch hub 248 to a clutch plate 254 that is secured via a splined connection 256 to quill shaft 54'. As such, range sleeve 250 couples ring gear 236 for common rotation with planet carrier 238. Thus, sun gear 234, planet gears 240 and ring gear 236 are effectively locked together so as to rotate as a common unit for directly transferring drive torque from drive shaft 50' to quill shaft 54'. With range sleeve 250 positioned in its neutral position, ring gear 236 is uncoupled from brake plate 252 and clutch plate 254. As such, rotation of drive shaft 50' causes sun gear 234 to rotate which, in turn, causes planet gears 240 to rotate about their respective pinion shaft 242 which, in turn, causes ring gear 236 to be rotatably driven. As a result, planet carrier 238 is not rotatably driven in response to rotation of sun gear 234, whereby quill shaft 54' is maintained in a non-driven status. As seen, quill shaft 54' is coupled via splined connection 258 to the input of interaxle differential 46. However, this synchronized range shift arrangement could also be integrated into an on-demand transfer case, similar to that shown in FIG. 8, if quill shaft 54' is coupled to directly drive rear output shaft 42.

To provide means for shifting range sleeve 250 on-the-fly between its three distinct positions, range sleeve 250 is coupled to shift fork 170. Moreover, synchronize shift mechanism 232 includes a first synchronizer 260 operably located between clutch hub 248 and brake plate 252, and a second synchronizer 262 operably located between clutch hub 248 and clutch plate 254. First synchronizer 260 is operable for causing speed synchronization between ring gear 236 and brake plate 252 upon movement of range sleeve 250 towards its low-range position and for completing such speed synchronization therebetween prior to clutch teeth 264 on range sleeve 250 being coupled to clutch teeth 266 on brake plate 252. In a like manner, second synchronizer assembly 262 is operable for causing speed synchronization between ring gear 236 and planet carrier 238 in response to movement of range sleeve 250 toward its high-range position and for completing such speed synchronization therebetween prior to clutch teeth 264 on range sleeve 250 entering into coupled engagement with clutch teeth 268 on clutch plate 254. It is contemplated that synchronizers 260 and 262 can be any suitable synchronizer clutch apparatus known in the art for facilitating such speed synchronization between the relatively rotatable components.

Figure 11:
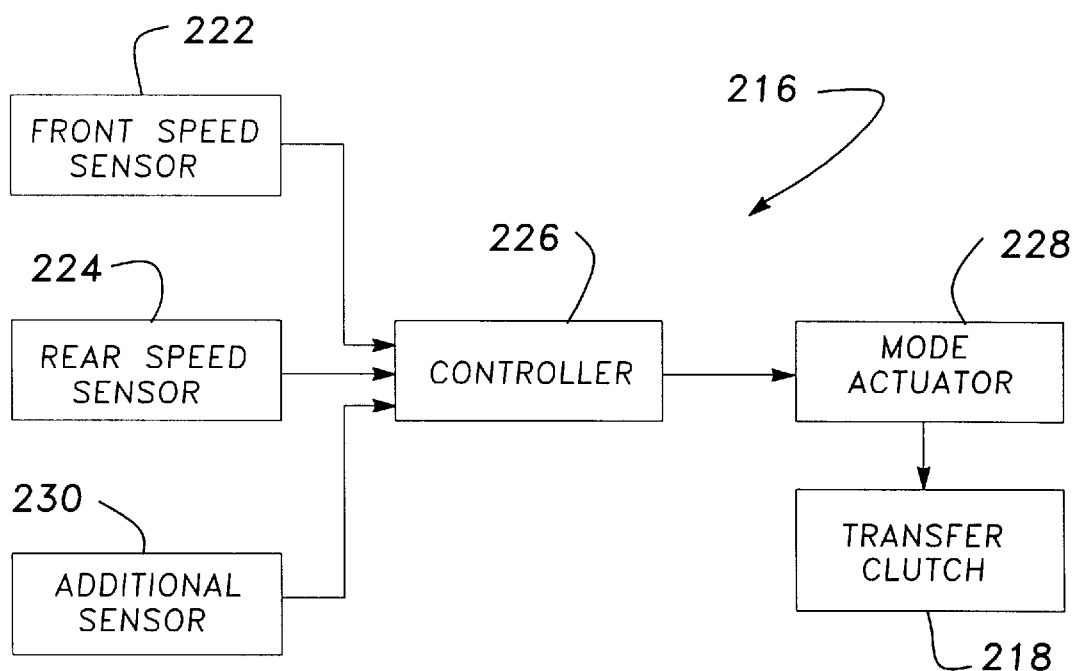
FIG. 11 is a block diagram for an electrically-controlled transfer clutch for use with a full-time transfer case similar to FIGS. 6 or 7 and an on-demand transfer case similar to FIG. 8.

FIG. 11 illustrates a block diagram of an electronically-controlled power transfer system 216 that can be adapted to control the actuated condition of torque transfer apparatus 180 in either a full-time arrangement similar to FIGS. 6 and 7 or an on-demand arrangement similar to FIG. 8. In each instance, torque transfer apparatus 180 would be a transfer clutch 218 having a multi-plate clutch assembly and a thrust mechanism that applies a clutch engagement force on the clutch pack. The thrust mechanism is moved relative to the clutch pack by a power-operated actuator 228 which receives electric control signals from a controller 226. The transfer clutch 218 can be of any (i.e., electromechanical, electromagnetic, hydraulically-actuated, etc.) type. To this end, system 216 includes a front speed sensor 222 for measuring the rotational speed of front output shaft 32 (or transfer shaft 84 or front prop shaft 30), a rear speed sensor 224 for measuring the rotational speed of rear output shaft 42' (or rear prop shaft 40), controller 226, and power-operated mode actuator 228. The speed signals from sensors 222 and 224 are delivered to controller 226 which determines a speed differential signal based thereon. If the speed differential signal exceeds a predetermined threshold value, then controller 226 actuates mode actuator 228 for applying a clutch engagement force on the clutch pack in transfer clutch 218 for transferring drive torque to the slower turning one of output shafts 32 and 42. The threshold value can be stored in look-up tables or calculated from stored algorithms. Actuation of mode actuator 228 can be either of the ON/OFF type or the ADAPTIVE type. Under the ON/OFF control scheme, transfer clutch 218 is fully-actuated when the speed differential signal exceeds the threshold value. Preferably, however, the ADAPTIVE control scheme is used to vary the magnitude of the clutch engagement force as a function of the magnitude of the speed differential signal. Additional sensor input signals, cumulatively shown by block 230, could also be inputted to controller 226 for modifying the parameters under while transfer clutch 218 is actuated. Such sensors could include vehicle speed sensor, brake sensor, acceleration sensor, and the like. In a full-time transfer case arrangement, transfer clutch 218 is operable to control differentiation and bias torque across the interaxle differential. In the on-demand transfer case arrangement, transfer clutch 218 is operable to distribute torque between front and rear output shafts 32 and 42. Mode actuator 228 may be a power-operated device that is distinct from actuator 62. Alternatively, actuator 62 may be used for coordinated control of range clutch 58 and transfer clutch 218 using a modified sector plate arrangement.

Referring to FIGS. 12 through 17 of the drawings, another version of full-time transfer case 20 is shown which can be incorporated into power transfer system 10. In this particular arrangement, interaxle differential 46' is a planetary gearset having a sun gear 270 coupled (i.e., splined) for rotation with transfer shaft 84, a ring gear 272 coupled (i.e., splined) for rotation with a rear output shaft 42, and a plurality of intermeshing pinion gears 274 carried by a planet carrier 276 coupled (i.e., splined) for rotation with a quill shaft 54. Moreover, each pinion gear 274 intermeshes with both sun gear 270 and ring gear 272. Transfer case 20 is also equipped with an electronically-controlled "slip limiting/torque-biasing" arrangement which includes transfer clutch 218 operably disposed between quill shaft 54 and rear output shaft 42 to automatically control the amount of speed differentiation and modify the torque distribution ratio between front and rear output shafts 32 and 42, respectively. Full-time transfer case 20 is also equipped with a drive mechanism 278 which includes a pivotable lever arm assembly 280 which is coupled to sector plate 184'. A mode pin 282 secured to lever arm assembly 280 extends into a mode slot 284 formed in sector plate 184'. As such, the contour of the range slot and mode slot 284 formed in sector plate 184' are designed to coordinate movement of range clutch 58 and lever arm assembly 280 in response to rotation of sector plate 184' via actuation of gearmotor 186. Alternatively, a second gear motor and sector plate could be provided for exclusively controlling actuation of lever arm assembly 280. Full-time transfer case 20 is readily adapted for use with a power transfer system having a first sensor group 286 for sensing specific dynamic and operational characteristics of the motor vehicle and for generating sensor input signals indicative thereof, with controller 226 used for generating a control signal in response to the sensor input signals. In operation, controller 226 controls the frictional biasing applied by transfer clutch 218 to the two output members (sun gear 270 and ring gear 272) of interaxle differential 46' by actuating gearmotor 186 as a function of the control signal.

As previously noted, controller 226 can be programmed to automatically control actuation of transfer clutch 218 pursuant to the "ON/OFF" control scheme. In such an arrangement, transfer clutch 218 is normally maintained in a non-actuated condition to permit speed differentiation between front and rear output shafts 32 and 42, respectively. In this condition, transfer case 20 is defined as operating in its full-time "differentiated" four-wheel drive mode. However, when the sensor input signals indicate a vehicular condition exceeding a predetermined value, transfer clutch 218 is fully actuated for "locking-up" interaxle differential 46' such that front and rear output shafts 32 and 42 are, in effect, rigidly coupled for establishing a "non-differentiated" four-wheel drive mode. Preferably, the vehicular condition used for controlling actuation of transfer clutch 218 is the speed differential ($\Delta N$) between front prop shaft 30 and rear prop shaft 40 or between front output shaft 32 and rear output shaft 42. Thereafter, transfer clutch 218 is returned to its non-actuation condition when the sensor input signals indicate that the magnitude of the vehicular condition is less than the predetermined value. Alternatively, controller 226 can be programmed in the "ADAPTIVE" control scheme to regulate the actuated condition of transfer clutch 218 between its non-actuated and fully-actuated limits for varying the magnitude of speed differentiation and drive torque transmitted across interaxle differential 46' as a function of the sensor input signals. In either of the above-noted control schemes, control over actuation of transfer clutch 218 is automatic and does not require any act or mode selection on the part of the vehicle operator. Thus, transfer clutch 218 controls speed differentiation across differential 46' in both of the high-range and low-range drive modes.

As a further option, mode select mechanism 64 can be adapted to permit the vehicle operator to select one of an "Automatic" mode and a "Locked" mode. In the Automatic mode, transfer clutch 218 is controllably actuated pursuant to either of the ON/OFF or ADAPTIVE control programs without input from the vehicle operator. However, when the "Locked" drive mode is selected, transfer clutch 218 is fully-actuated to lock-up differential 46' for delivering non-differentiated drive to transfer case output shafts 32 and 42. The "Locked" mode is provided for permitting improved traction when the motor vehicle is being operated off-road or on severe road conditions. Additionally, the "Locked" mode can be made available for use in conjunction with either or both of the high-range and low-range drive modes. As before, mode select mechanism 64 can include any suitable selection mechanism (i.e., shift lever, push-button, etc.) capable of generating a mode signal inputted to controller 226.

With continued reference to FIG. 12, a preferred construction for transfer clutch 218 will now be described. A radially-extending end plate 290 connects ring gear 272 to rear output shaft 42. Ring gear 272 is defined by a set of internal gear teeth 292 formed on the inner peripheral surface of a cylindrical outer drum 294 that is fixed to end plate 290. Gear teeth 292 of ring gear 272 are shown in constant meshed engagement with gear teeth 296 of pinion gears 274. As is also shown, planet carrier 276 includes a pair of annular carrier rings 298 and 300 between which pinion gears 274 are journally supported for rotation on pins 302. Carrier ring 298 is fixed (i.e., splined) for common rotation with quill shaft 54. Sun gear 270 has external gear teeth 304 formed thereon which are in constant meshed engagement with gear teeth 296 of pinion gears 274.

Transfer clutch 218 is a mechanically-actuated multi-plate friction clutch assembly arranged to concentrically surround a portion of quill shaft 54. As noted, outer drum 294 is secured by end plate 290 to rear output shaft 42 for rotation therewith. Transfer clutch 218 also includes inner drum 306 that is fixed (i.e., splined) to quill shaft 54 for rotation therewith. Thus, outer drum 294 surrounds inner drum 306 to form an internal chamber therebetween, with outer drum 294 and inner drum 306 being capable of rotating relative to one another. A stop plate 308 is splined for rotation with inner drum 306 and abuts a radial flange stop 310 formed thereon. Disposed within the internal chamber are two set of alternatively interleaved friction clutch plates that are operable for limiting speed differentiation and biasing the torque distribution across interaxle differential 46'. Inner clutch plates 312 are mounted (i.e., splined) to an externally-splined rim segment 314 of inner drum 306 for driven rotation with quill shaft 54. Outer clutch plates 316 are mounted (i.e., splined) to an internally-splined segment of outer drum 294 for rotation with rear output shaft 42. The interleaved clutch plates are supported for axial sliding movement to establish frictional contact therebetween.

A thrust mechanism 318 is supported for axial sliding movement on the outer circumference of quill shaft 54 and is operable for frictional compressing the interleaved clutch plates as a function of the clutch engagement force exerted thereon. Thrust mechanism 318 includes an annular inner bearing support 320 which, in this particular embodiment, is journally supported for sliding non-rotatable movement on quill shaft 54. Inner bearing support 320 includes one or more axial flanges 322 that are nested within corresponding apertures in a lever arm 324 for limiting rotation of inner bearing support 320 relative to quill shaft 54 and inner drum 306. Thrust mechanism 318 also includes an annular outer bearing support 326 coupled for rotation with inner drum 294. As seen, axial lugs 328 formed on the distal end of cylindrical rim segment 314 are nested within apertures 330 in a plate segment 332 of outer bearing support 326. A bearing assembly 333 is retained between inner bearing support 320 and outer bearing support 326. Thus, outer bearing support 326 is supported for rotation with inner drum 306 while inner bearing support 320 is held stationary relative thereto. Buttons mounted to lever arm 324 act on inner bearing support 320 for causing sliding movement of thrust mechanism 318 in response to pivotal movement of lever arm assembly 280 for causing a clutch engagement force to be exerted by plate segment 332 of outer bearing support 326 on the interleaved clutch plates. An annular return spring 334 is retained between inner drum 306 and outer bearing support 326 for normally biasing thrust mechanism 318 in a direction away from the interleaved clutch plates.

As noted, actuator 62 is an electric gearmotor which is operable for generating an output torque, the value of which varies as a function of the magnitude of the electrical control signal applied thereto by controller 226. Accordingly, drive mechanism 278 is interconnected to output member 188 of gearmotor 186 for changing the output torque into an axially-directed force used for controlling the clutch engagement force applied to thrust mechanism 318 of transfer clutch 218. In particular, sector plate 184' is interconnected by mode pin 282 to lever arm 324 and is driven through a limited range of angular motion by output member 188 of gearmotor 186. As such, the direction and magnitude of rotation of sector plate 184' causes corresponding pivotal movement of lever arm 324 which, in turn, causes sliding movement of thrust mechanism 318 for exerting the clutch engagement force on the interleaved clutch plates. To generate the desired clutch engagement force, sector plate 184' includes mode slot 284 within which a crowned roller 336 fixed to mode pin 282 is retained. Mode pin 282 is fixed to flange section 338 of lever arm 324. The bifurcated ends of lever arm 324 are retained for pivotal movement on rail 340, the ends of which are retained in suitable sockets (not shown) formed in housing 56.

Figure 12:
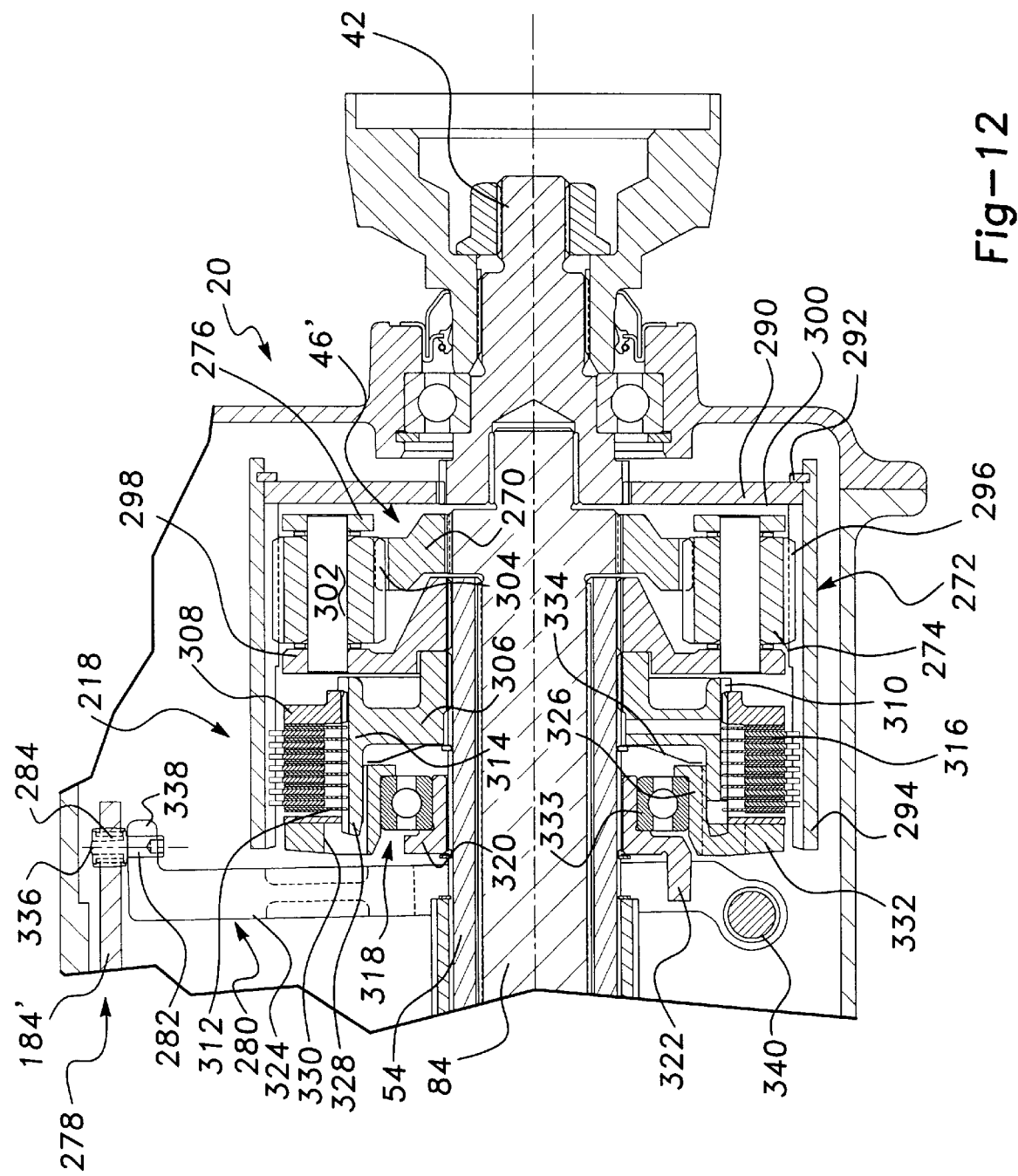
FIG. 12 is a partial sectional view of a full-time transfer case having single planetary-type interaxle differential and an electronically-controlled transfer clutch.

The power transfer system of the present invention equipped with full-time transfer case 20 shown in FIG. 12 functions to continuously monitor interaxle speed differentiation ($\Delta N$) across differential 46'. Since the magnitude of the clutch engagement force generated by lever arm assembly 280 and applied to transfer clutch 218 is proportional to the magnitude of the output torque generated by gearmotor 186 which, in turn, is proportional to the magnitude of the control signal (i.e., percentage duty cycle) applied by controller 226 to gearmotor 186, the magnitude of the clutch engagement force exerted on transfer clutch 218 is also proportional to the magnitude of the control signal. Moreover, a brake 342 (FIG. 13) can be used for braking output member 188 of actuator 62 to maintain sector plate 184 in a locked position following selection via mode select mechanism 64 of the Locked mode, thereby permitting the power to actuator 62 to be interrupted for minimizing its on-time service requirements.

Figure 13:
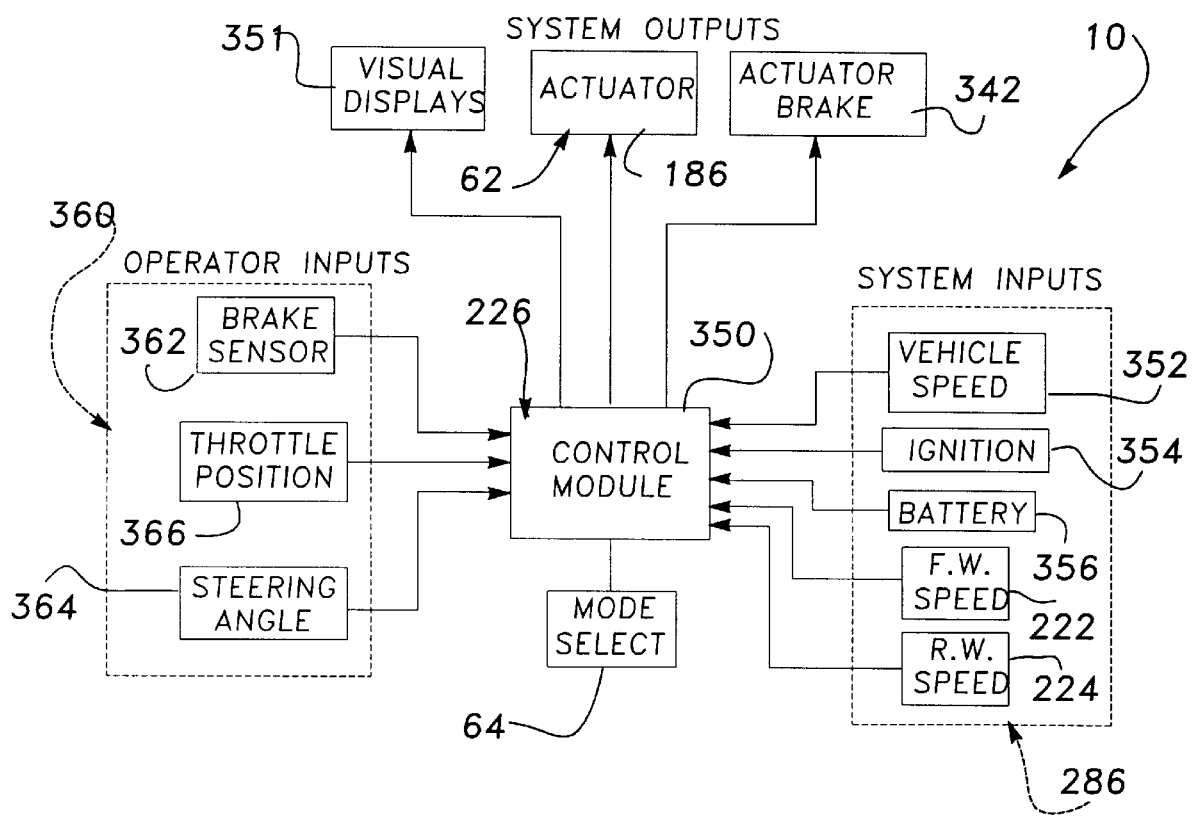
FIG. 13 is a block diagram of a control system for use with the transfer case shown in FIG. 12.

With particular reference now to FIG. 13, a block diagram of a control system is shown. Preferably, controller 226 is an electronic control unit or module 350 having signal processing and information storage capabilities. A visual display 351 is provided within the passenger compartment of the vehicle to indicate the particular mode in which transfer case 20 is currently operating. In addition, first sensor group 286 is shown as a group of various "system" sensors that are provided for detecting and signaling specific dynamic and operational characteristics of the motor vehicle. The input signals generated by the "systems" sensor group are delivered to electronic control module 350. Preferably, these sensors include front speed sensor 222 for sensing the rotational speed ($n_F$) of front prop shaft 30 or front output shaft 32, rear speed sensor 224 for sensing the rotational speed ($n_R$) of rear prop shaft 40 or rear output shaft 42, a vehicle speed sensor 352 for sensing a vehicle speed (V), an ignition switch 354 for signalling the operational status of the vehicle, and a battery input 356 for powering electronic control module 350. In vehicles equipped with an anti-lock brake system (ABS), the original equipment ABS sensors provided at each wheel can be used for determining an "average" front drive shaft speed and rear drive shaft speed. Moreover, it is possible for vehicle speed sensor 352 to be eliminated with the vehicle speed signal (V) being computed from the front rotational speed signal ($n_F$) generated by front speed sensor 222. However, it is to be understood that any suitable speed sensing arrangement capable of generating a signal indicative of the rotational speed of a shaft is fairly within the scope of the present invention.

The control system also illustrates the use of various "operator-initiated" inputs, as generally categorized by second sensor means 360. These inputs include a brake sensor 362 for sensing when the vehicle operator is applying the brakes, a steering angle sensor 364 for detecting the magnitude of a steering angle ($\phi$), and an accelerator sensor for sensing an accelerating condition of the vehicle. Preferably, the accelerator sensor is a throttle position sensor 366 for sensing the degree of opening of a throttle valve associated with engine 16 or for sensing the degree of depression of an accelerator pedal, and is operable to produce a throttle position signal (A). The operator-initiated input signals are delivered to control module 350 where they are used, in conjunction with the system input signals, to further control "on-demand" operation.

Figure 15:
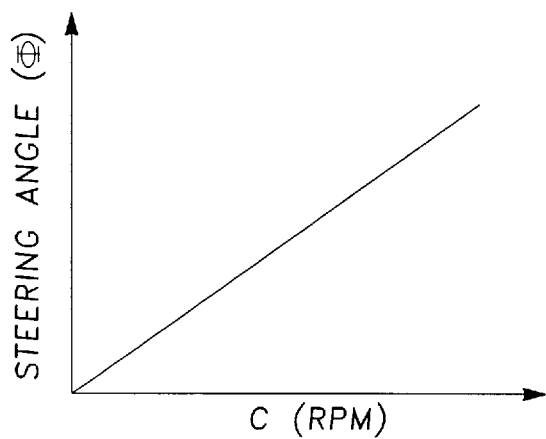
Figure 16:
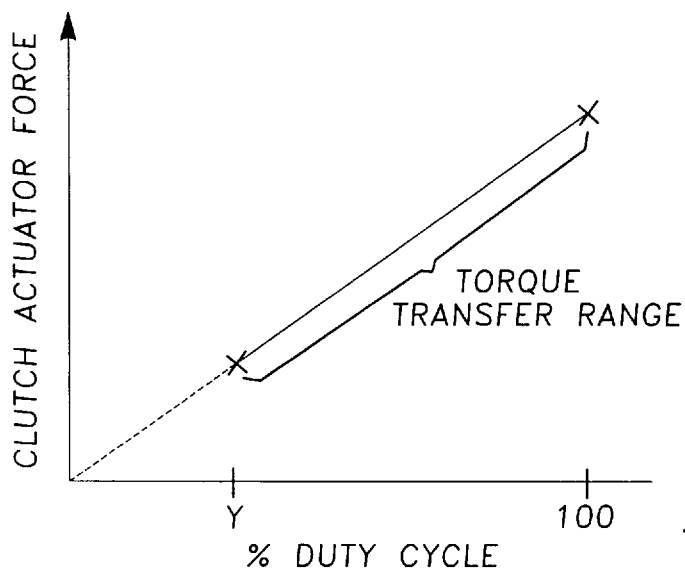
Figure 17:
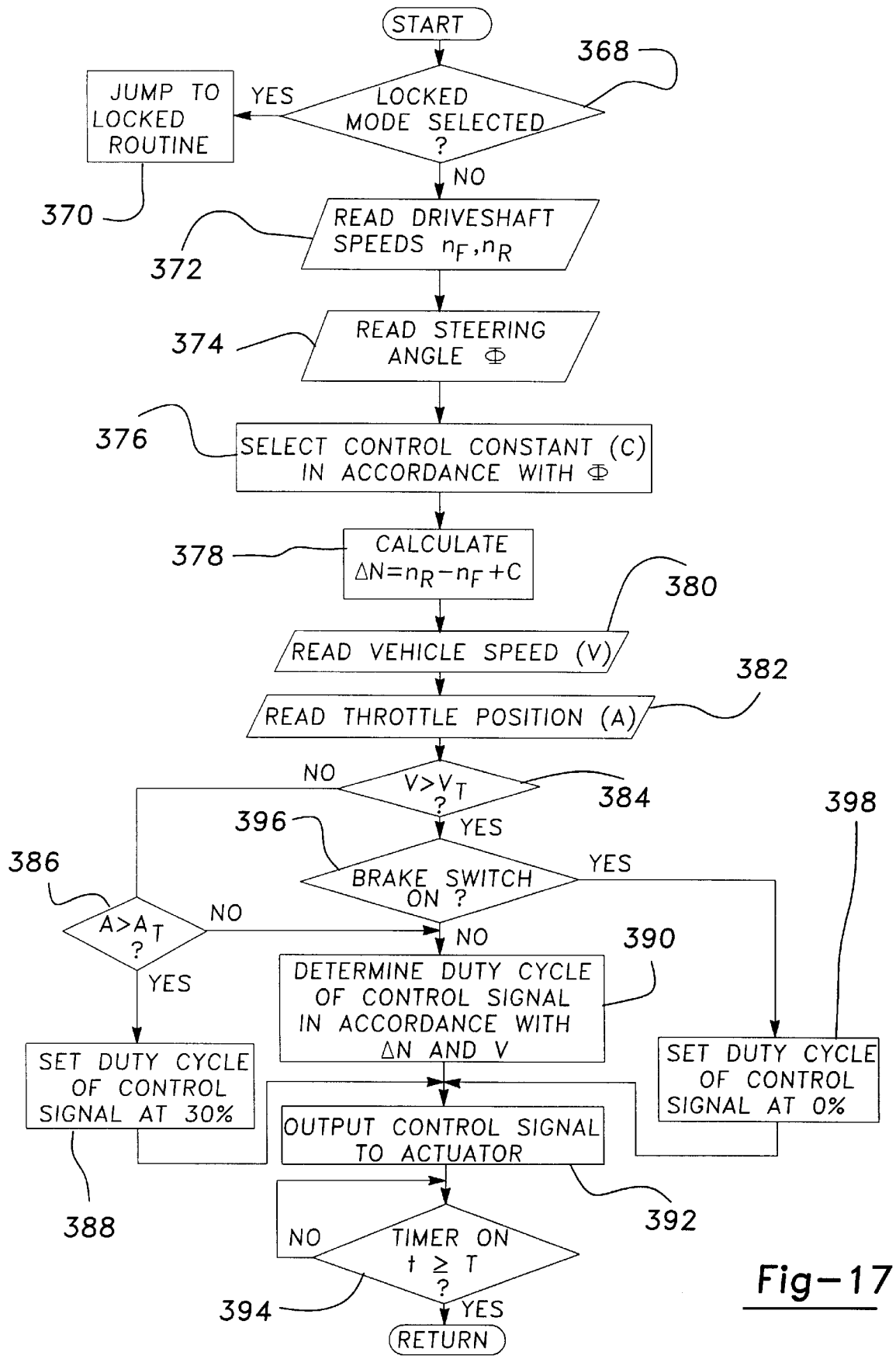
FIG. 17 is a flow chart depicting a control sequence for the operations performed by the control system of FIG. 13.

With reference now to FIG. 17, a control sequence for controlling the "on-demand" operation of power transfer system 10 is shown. In general, the flow chart represents a sequence of the operations performed by electronic control module 350 and which are diagrammatically shown in block form. More specifically, the flow chart illustrates a succession of control steps that are continuously repeated for selecting the value of the control signal to be applied to actuator 62 in accordance with various predefined relationships between the current value of a front and rear wheel speed differential ($\Delta N$) and vehicle speed (V), as modified by the steering angle ($\phi$) and other operator-initiated inputs. Block 368 is representative of the step determining whether a mode signal from mode select mechanism 64 indicating selection of a "Locked" mode has been received. If yes, then the control sequence jumps to a locked routine, as indicated by block 370, wherein transfer clutch 218 is fully-actuated and brake 342 is subsequently engaged. If no, the control sequences moves to block 372 which is representative of the "Automatic" control step in which the current value of the front rotational speed ($n_F$) and the rear rotational speed ($n_R$) are read. Block 374 indicates the step of reading the value of steering angle ($\phi$) as detected by steering angle sensor 364. Block 376 represents the operation of selecting a control characteristic (C) in accordance with the steering angle ($\phi$). FIG. 15 illustrates a plot of an exemplary relationship, which may be stored as a look-up table or computed from an arithmetic equation in control module 350, which correlates the control characteristic (C) as a linear function of the detected steering angle ($\phi$). Next, block 378 represents the step of calculating a speed differential ($\Delta N$) according to the equation $\Delta N = n_R - n_F + C$ Blocks 380 and 382 indicate the steps of reading the current value of the vehicle speed (V) as detected by vehicle speed sensor 352 and the throttle position (A) as detected by throttle position sensor 366, respectively. As shown in block 384, control module 350 determines whether the vehicle speed (V) exceeds a predefined threshold value ($V_T$) such as, for example, 5 mph. If the vehicle speed is less than the threshold value ($V_T$), a second determination is made, at block 386, as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electrical control signal is set as a preset value, such as 30% duty cycle, as indicated by block 388. In this manner, power transfer system 10 is adapted to transfer torque to front wheels 12 in response to acceleration at low vehicle speeds to inhibit anticipated wheel slip. However, if the value of the throttle position (A) is less than its threshold value ($A_T$), then the magnitude of the duty cycle for the control signal is set in accordance with predefined relationships between the speed differential signal ($\Delta N$) and vehicle speed (V), as indicated by block 390. Block 392 represents the step of outputting the electrical control signal to rotary actuator 186 for developing the desired amount of torque transfer, if any, across transfer clutch 218. As shown in block 394, a timer circuit within control module 350 is actuated simultaneously with energization of rotary actuator 186 for maintaining such energization for a predetermined time period (T). Once the period of energization (t) equals the predetermined time period (T) (or t≦T), control module 350 repeats the control routine.

To enhance steering control, block 396 is indicative of the control step between steps 384 and 390 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 362) during an occurrence of a low traction road condition and the vehicle speed (V) is greater than the predefined threshold ($V_T$), then control module 350 sets the magnitude of the control signal sent to rotary actuator 186 to zero (block 398) for de-actuating transfer clutch 218 and disabling the "on-demand" feature. This control sequence prevents simultaneous braking and "on-demand" operation for providing the vehicle operator with greater steering and braking control. However, during the occurrence of a low traction condition when brake sensor 362 signals control module 350 that the vehicle operator is not applying the brakes, electronic control module 350 automatically energizes rotary actuator 186 (block 392) for actuating transfer clutch 218 in accordance with the relationships generally denoted by block 390.

Figure 14:
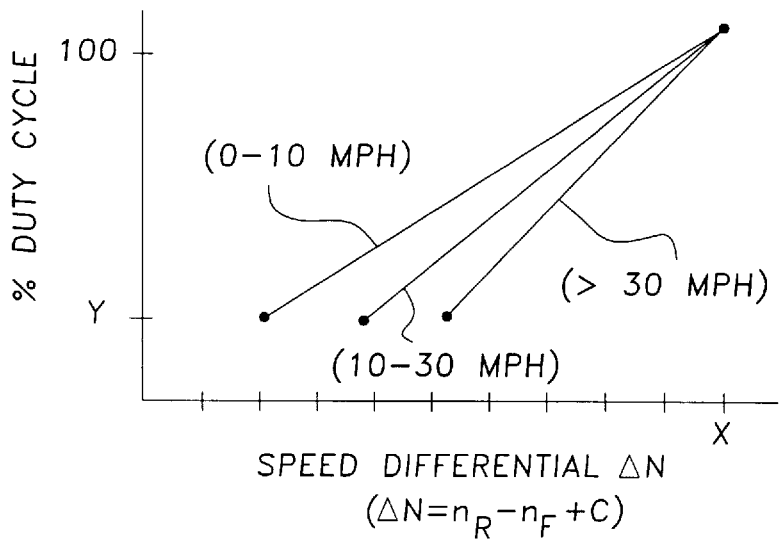
FIGS. 14 through 16 are plots of various relationships associated with the control system of FIG. 13.

With particular reference to FIG. 14, a set of exemplary plots used for establishing the magnitude of the duty cycle to be sent to rotary actuator 186 in response to the current value of the speed differential ($\Delta N$) and vehicle speed (V) during "on-demand" operation, as diagrammatically referred to by block 390 in FIG. 17, will now be detailed. As seen, power transfer system 10 correlates the percentage duty cycle of the control signal applied to rotary actuator 186 to a range of speed differential ($\Delta N$) values. In general, the percentage duty cycle for the control signal increases linearly from a minimum actuation value (Y %) to a maximum actuation value (100%) as the value of the speed differential ($\Delta N$), within a particular vehicle speed range, increases from a minimum speed differential limit to a maximum speed differential limit (X). As such, when the value of the speed differential ($\Delta N$) is less than the minimum speed differential limit, no torque biasing is transmitted through transfer clutch 218. However, when the value of the speed differential ($\Delta N$) exceeds the minimum differential limit, torque biasing is provided by supplying a control signal to rotary actuator 186 having a duty cycle value greater than (Y %). Thus, the minimum actuation duty cycle (Y %) for the control signal correlates to the point at which frictional engagement between interleaved clutch plates 312 and 316 results in the initiation of torque biasing control by transfer clutch 218.

The portion of the total drive torque transferred through transfer clutch 218 increases substantially linearly as the magnitude of the duty cycle for the control signal increases from the minimum actuation value (Y %) to the maximum actuation value (100%). Preferably, the maximum value (X) of the speed differential ($\Delta N$) correlates to the maximum actuation duty cycle (100%) at which point the maximum clutch engagement force is generated for completely locking-up clutch plates 312 and 316. During operation, a reduction in the magnitude of the control signal sent to rotary actuator 186 will result in actuator output member 188 being back-driven due to the clutch engagement load exerted by lever arm assembly 280 on sector plate 184. Alternatively, the direction of driven rotation of actuator output member 188 may be reversed until the desired clutch engagement force is established. As best seen from FIG. 16, an exemplary linear relationship between the magnitude of the duty cycle supplied to rotary actuator 186 and the clutch engagement force generated and, in turn, the amount of torque transferred across transfer clutch 218 is shown.

It is contemplated that a version of transfer clutch 218 disclosed above in association with the full-time transfer case arrangement shown in FIG. 12 could likewise be used in an on-demand four-wheel drive arrangement in those applications where interaxle differential 46' is not required. In such an arrangement, transfer clutch 218 would be operable to automatically transfer torque to transfer shaft 84 from quill shaft 50 when traction loss occurs at rear wheels 34.

Finally, transfer case 20 includes an inlet port 400 and an outlet port 402 formed in housing 66 for connection to an external lubrication supply and cooling system 404. Alternatively, an internal lube pump and supply arrangement could be incorporated into transfer case 20.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case for transferring drive torque from a drivetrain to first and second drivelines of a motor vehicle, said transfer case comprising:

an input shaft supported for rotation about a first rotary axis and adapted to be driven by the drivetrain;

a first output shaft supported for rotation about a second rotary axis and adapted to be interconnected to the first driveline;

a second output shaft supported for rotation about a third rotary axis which is offset from said first and second axes, said second output shaft adapted to be interconnected to the second driveline;

a drive shaft supported for rotation about said third rotary axis and driven by said input shaft;

an interaxle differential having an input, a first output coupled to said first output shaft, and a second output coupled to said second output shaft; and a drive mechanism for selectively coupling said input of said interaxle differential to said drive shaft.

2. The transfer case of claim 1 further comprising a torque transfer apparatus for limiting slip and biasing torque transferred between said first and second outputs of said interaxle differential.

3. The transfer case of claim 2 wherein said torque transfer apparatus is a transfer clutch having a first set of clutch plates fixed for rotation with said input of said interaxle differential and a second set of clutch plates fixed for rotation with said first output of said interaxle differential, said second set of clutch plates being interleaved with said first set of clutch plates such that a clamping force exerted thereon limits relative movement therebetween.

4. The transfer case of claim 3 wherein said transfer clutch is a viscous coupling.

5. The transfer case of claim 3 wherein said transfer clutch further includes a thrust mechanism for exerting said clamping force on said interleaved clutch plates, said thrust mechanism is supported for movement relative to said clutch plates for varying the clamping force between a minimum value and a maximum value in response to a speed differential between said first and second outputs of said interaxle differential.

6. The transfer case of claim 5 further comprising sensors for detecting the rotary speed of said first and second outputs of said interaxle differential or of said first and second output shafts and generating sensor input signals indicative thereof, an actuator for moving said thrust mechanism for applying said clamping force on said interleaved clutch plates, and a controller for generating a speed differential signal from said sensor input signals and controlling actuation of said actuator in response to said speed differential signal.

7. The transfer case of claim 2 wherein said torque transfer apparatus is a transfer clutch having a first set of clutch plates fixed for rotation with said first output of said interaxle differential and a second set of clutch plates fixed for rotation with said second output of said interaxle differential, said second set of clutch plates being interleaved with said first set of clutch plates such that a clamping force exerted thereon limits relative movement therebetween.

8. The transfer case of claim 7 wherein said transfer clutch is a viscous coupling.

9. The transfer case of claim 8 wherein said transfer clutch further includes a thrust mechanism for exerting said clamping force on said interleaved clutch plates, said thrust mechanism is supported for movement relative to said clutch plates for varying the clamping force between a minimum value and a maximum value in response to a speed differential between said first and second outputs of said interaxle differential.

10. The transfer case of claim 9 further comprising sensors for detecting the rotary speed of said first and second outputs of said interaxle differential or of said first and second output shafts and generating sensor input signals indicative thereof, an actuator for moving said thrust mechanism for applying said clamping force on said interleaved clutch plates, and a controller for generating a speed differential signal from said sensor input signals and controlling actuation of said actuator in response to the magnitude of said speed differential signal.

11. The transfer case of claim 1 wherein said drive mechanism includes a quill shaft fixed to said input of said interaxle differential and a clutch for selectively coupling said drive shaft to said quill shaft.

12. The transfer case of claim 11 further comprising a gear reduction unit adapted to be driven by said drive shaft at a reduced speed ratio relative thereto, said clutch is operable in a first mode to couple said quill shaft for rotation with said drive shaft at a direct speed ratio, and said clutch is operable in a second mode to couple said gear reduction unit to said quill shaft for driving said quill shaft at said reduced speed ratio.

13. The transfer case of claim 12 further comprising a synchronizer operable in association with said clutch for causing speed synchronization between said drive shaft and said quill shaft in response to said clutch being shifted in said first mode, and said synchronizer causing speed synchronization between said quill shaft and said gear reduction and in response to said clutch being shifted into said second mode, and a shift mechanism for shifting said clutch between said first and second modes.

14. The transfer case of claim 1 wherein said interaxle differential is a dual-planetary assembly having a carrier assembly as said input, a first sun gear as said first output, and a second sun gear as said second output, said carrier assembly includes a first pinion gear meshed with said first sun gear and a second pinion gear meshed with said second sun gear and said first pinion gear.

15. A transfer case for transferring drive torque from a drivetrain to first and second drivelines of a motor vehicle, said transfer case comprising:

an input shaft supported for rotation about a first rotary axis and adapted to be driven by the drivetrain;

a first output shaft supported for rotation about a second rotary axis and adapted to be interconnected to the first driveline;

a second output shaft supported for rotation about a third rotary axis which is offset from said first and second axes, said second output shaft adapted to be interconnected to the second driveline;

a drive shaft supported for rotation about said third rotary axis;

a first drive mechanism coupling said drive shaft to said input shaft;

a transfer shaft supported for rotation about said third rotary axis;

a second drive mechanism coupling said transfer shaft to said first output shaft;

an interaxle differential having an input, a first output coupled to said first output shaft, and a second output coupled to said transfer shaft; and a clutch for selectively coupling said drive shaft to said input of said interaxle differential.

16. The transfer case of claim 15 further comprising a torque transfer apparatus for limiting slip and biasing torque transfer across said first and second outputs of said interaxle differential.

17. The transfer case of claim 16 wherein said torque transfer apparatus is a transfer clutch having a first set of clutch plates fixed for rotation with said input of said interaxle differential and a second set of clutch plates fixed for rotation with said first output of said interaxle differential, said second set of clutch plates being interleaved with said first set of clutch plates such that a clamping force exerted thereon limits relative movement therebetween.

18. The transfer case of claim 17 wherein said transfer clutch further includes a thrust mechanism for exerting said clamping force on said interleaved clutch plates, said thrust mechanism is supported for movement relative to said interleaved clutch plates for varying the clamping force between a minimum value and a maximum value in response to a speed differential between said first and second outputs of said interaxle differential.

19. The transfer case of claim 18 further comprising sensors for detecting the rotary speed of said first and second outputs of said interaxle differential or of said first and second output shafts and generating sensor input signals indicative thereof, an actuator for moving said thrust mechanism for applying said clamping force on said interleaved clutch plates, and a controller for generating a speed differential signal from said sensor input signals and controlling actuation of said actuator in response to said speed differential signal.

20. The transfer case of claim 16 wherein said torque transfer apparatus is a transfer clutch having a first set of clutch plates fixed for rotation with said first output of said interaxle differential and a second set of clutch plates fixed for rotation with said second output of said interaxle differential, said second set of clutch plates being interleaved with said first set of clutch plates such that a clamping force exerted thereon limits relative movement therebetween.

21. The transfer case of claim 20 further comprising sensors for detecting the rotary speed of said first and second outputs of said interaxle differential or of said first and second output shafts and generating sensor input signals indicative thereof, a thrust mechanism for exerting said clamping force on said interleaved clutch plates, said thrust mechanism movable to varying the clamping force between a minimum value and a maximum value, an actuator for moving said thrust mechanism for applying said clamping force on said interleaved clutch plates, and a controller for generating a speed differential signal from said sensor input signals and controlling actuation of said actuator in response to said speed differential signal.

22. The transfer case of claim 15 further comprising a gear reduction unit adapted to be driven by said drive shaft at a reduced speed ratio relative thereto, said clutch is operable in a first mode to couple said input of said interaxle differential for rotation with said drive shaft at a direct speed ratio, and said clutch is operable in a second mode to couple said gear reduction unit to said input for rotation with said drive shaft at said reduced speed ratio.

23. The transfer case of claim 22 further comprising a synchronizer operable in association with said clutch for causing speed synchronization between said drive shaft and said quill shaft in response to said clutch being shifted in said first mode, and said synchronizer causing speed synchronization between said quill shaft and said gear reduction and in response to said clutch being shifted into said second mode, and a shift mechanism for shifting said clutch between said first and second modes.

24. The transfer case of claim 15 wherein said transfer clutch is a viscous coupling.

25. The transfer case of claim 15 wherein said drive shaft concentrically surround said transfer shaft for relative rotation about said second rotary axis.

26. A transfer case for transferring drive torque from a drivetrain to first and second drivelines of a motor vehicle, said transfer case comprising:
an input shaft supported for rotation about a first rotary axis and adapted to be driven by the drivetrain;
a first output shaft supported for rotation about a second rotary axis and adapted to be interconnected to the first driveline;
a second output shaft supported for rotation about a third rotary axis which is offset from said first and second axes, said second output shaft adapted to be interconnected to the second driveline;
a drive shaft supported for rotation about said third rotary axis;
a first drive mechanism coupling said drive shaft to said input shaft;
a transfer shaft supported for rotation about said third rotary axis;
a second drive mechanism coupling said transfer shaft to said first output shaft;
an interaxle differential having an input, a first output coupled to said first output shaft, and a second output coupled to said transfer shaft;
a clutch for selectively coupling said drive shaft to said input of said interaxle differential; and
a torque transfer apparatus for limiting slip and biasing torque transfer between said first and second outputs of said interaxle differential.

27. The transfer case of claim 26 further comprising a gear reduction unit adapted to be driven by said drive shaft at a reduced speed ratio relative thereto, said clutch is operable in a first mode to couple said input of said interaxle differential for rotation with said drive shaft at a direct speed ratio, and said clutch is operable in a second mode to couple said gear reduction unit to said input for rotation with said drive shaft at said reduced speed ratio.

28. A transfer case comprising:
an input shaft supported for rotation about a first rotary axis;
a first output shaft supported for rotation about a second rotary axis;
a second output shaft supported for rotation about a third rotary axis which is offset from said first and second axes;
a drive shaft supported for rotation about said third rotary axis and driven by said input shaft; and
a torque transfer apparatus coupling said second output shaft for rotation with said drive shaft and operable for transferring drive torque from said drive shaft to said first output shaft in response to speed differentiation between said first and second output shafts.

29. The transfer case of claim 28 wherein said torque transfer apparatus is a transfer clutch having a first clutch member connecting said drive shaft to said second output shaft, a second clutch member fixed for rotation with first output shaft, a first set of clutch plates fixed for rotation with said first clutch member, and a second set of clutch plates fixed for rotation with said second clutch member, said second set of clutch plates being interleaved with said first set of clutch plates such that a clamping force exerted thereon limits relative movement therebetween.

30. The transfer case of claim 29 wherein said transfer clutch is a viscous coupling.

31. The transfer case of claim 29 wherein said transfer clutch further includes a thrust mechanism for exerting said clamping force on said interleaved clutch plates, said thrust mechanism is supported for movement relative to said clutch plates for varying the clamping force between a minimum value and a maximum value in response to a speed differential between said first and second output shafts.

32. The transfer case of claim 31 further comprising sensors for detecting the rotary speed of said first and second output shafts and generating sensor input signals indicative thereof, an actuator for moving said thrust mechanism for applying said clamping force on said interleaved clutch plates, and a controller for generating a speed differential signal from said sensor input signals and controlling actuation of said actuator in response to said speed differential signal.

33. The transfer case of claim 28 further comprising a gear reduction member driven by said drive shaft at a reduced speed ratio relative thereto, and a range clutch operable in a first mode to couple said second output shaft for common rotation with said drive shaft, said range clutch is further operable in a second mode to couple said second output shaft for rotation with said gear reduction member.

34. A transfer case comprising:

an input shaft supported for rotation about a first rotary axis;

a first output shaft supported for rotation about a second rotary axis;

a second output shaft supported for rotation about a third rotary axis which is offset from said first and second axes:

a drive shaft supported for rotation about said third rotary axis;

a first drive mechanism coupling said drive shaft to said input shaft;

a transfer shaft supported for rotation about said third rotary axis;

a second drive mechanism coupling said transfer shaft to said first output shaft;

a quill shaft supported for rotation about said third axis;

a clutch for selectively coupling said drive shaft to said quill shaft; and a torque transfer apparatus coupling said second output shaft for rotation with said quill shaft and operable for transferring drive torque from said quill shaft to said first output shaft in response to speed differentiation between said first and second output shafts.

35. The transfer case of claim 34 wherein said torque transfer apparatus is a transfer clutch having a first clutch member connecting said quill shaft to said second output shaft, a second clutch member fixed for rotation with first transfer shaft, a first set of clutch plates fixed for rotation with said first clutch member, and a second set of clutch plates fixed for rotation with said second clutch member, said second set of clutch plates being interleaved with said first set of clutch plates such that a clamping force exerted thereon limits relative movement therebetween.

36. The transfer case of claim 35 wherein said transfer clutch further includes a thrust mechanism for exerting said clamping force on said interleaved clutch plates, said thrust mechanism is supported for movement relative to said clutch plates for varying the clamping force between a minimum value and a maximum value in response to a speed differential between said first and second output shafts.

37. The transfer case of claim 36 further comprising sensors for detecting the rotary speed of said first and second output shafts and generating sensor input signals indicative thereof, an actuator for moving said thrust mechanism for applying said clamping force on said interleaved clutch plates, and a controller for generating a speed differential signal from said sensor input signals and controlling actuation of said actuator in response to said speed differential signal.

38. The transfer case of claim 34 further comprising a gear reduction unit driven by said drive shaft, said clutch is operable in a first mode to couple said quill shaft for rotation with said drive shaft and is further operable in a second mode to couple said quill shaft for rotation with said gear reduction unit.

* * * * *